(12) United States Patent
Kubena et al.

(10) Patent No.: US 7,202,100 B1
(45) Date of Patent: *Apr. 10, 2007

(54) METHOD OF MANUFACTURING A CLOVERLEAF MICROGYROSCOPE AND CLOVERLEAF MICROGYROSCOPE

(75) Inventors: Randall L. Kubena, Oak Park, CA (US); Frederic P. Stratton, Beverly Hills, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 10/933,853

(22) Filed: Sep. 3, 2004

(51) Int. Cl.
*H01L 21/00* (2006.01)

(52) U.S. Cl. .................. 438/51; 257/417; 257/E21.499; 73/504.14

(58) Field of Classification Search .................. 438/51, 438/52; 257/414, 417, 418, E21.499; 73/504.08, 73/504.18, 503.3, 504.2, 504.14

See application file for complete search history.

(56) References Cited

U.S. PATENT DOCUMENTS

| | | | |
|---|---|---|---|
| 5,001,940 A | 3/1991 | Ogawa | 74/5.6 D |
| 5,134,881 A | 8/1992 | Henrion et al. | 73/517 R |
| 5,203,208 A * | 4/1993 | Bernstein | 73/504.12 |
| 5,313,835 A | 5/1994 | Dunn | 73/505 |
| 5,377,544 A | 1/1995 | Dunn | 73/505 |
| 5,490,420 A * | 2/1996 | Burdess | 73/504.02 |
| 5,511,419 A | 4/1996 | Dunn | 73/504.08 |
| 5,756,895 A * | 5/1998 | Kubena et al. | 73/504.15 |
| 5,894,090 A | 4/1999 | Tang et al. | 73/504.02 |
| 6,079,272 A | 6/2000 | Stell et al. | 73/504.12 |
| 6,164,134 A | 12/2000 | Cargille | 73/504.02 |
| 6,297,072 B1 | 10/2001 | Tilmans et al. | 438/106 |
| 6,405,594 B1 * | 6/2002 | Tang et al. | 73/504.02 |
| 6,487,907 B1 * | 12/2002 | Tang et al. | 73/504.02 |
| 6,539,801 B1 | 4/2003 | Gutierrez et al. | 73/504.12 |
| 6,555,404 B1 | 4/2003 | Kubena et al. | 438/22 |
| 6,584,845 B1 * | 7/2003 | Gutierrez et al. | 73/514.15 |
| 6,629,460 B2 | 10/2003 | Challoner | 73/504.2 |
| 6,698,287 B2 | 3/2004 | Kubena et al. | 73/514.15 |
| 6,758,093 B2 | 7/2004 | Tang et al. | 73/504.2 |

(Continued)

OTHER PUBLICATIONS

Johnson, J.J., et al., "Fabrication of Silicon Masters for Microcontact Printing," *National Nanofabrication Users Network*, The Penn State Nanofabrication Facility, pp. 48-49 (2000).

(Continued)

*Primary Examiner*—Bradley K. Smith
*Assistant Examiner*—Steven J. Fulk
(74) *Attorney, Agent, or Firm*—Ladas & Parry LLP

(57) ABSTRACT

The present invention relates to a method of manufacturing a cloverleaf microgyroscope containing an integrated post comprising: attaching a post wafer to a resonator wafer, forming a bottom post from the post wafer being attached to the resonator wafer, attaching the resonator wafer to a base wafer, wherein the bottom post fits into a post hole in the base wafer, forming a top post from the resonator wafer, wherein the bottom and top post are formed symmetrically around the same axis, and attaching a cap wafer on top of the base wafer. The present invention relates further to a gyroscope containing an integrated post with on or off-chip electronics.

37 Claims, 39 Drawing Sheets

U.S. PATENT DOCUMENTS

| | | | |
|---|---|---|---|
| 6,796,179 B2 * | 9/2004 | Bae et al. | 73/504.12 |
| 6,841,838 B2 * | 1/2005 | Kubena et al. | 257/415 |
| 6,944,931 B2 | 9/2005 | Shcheglov et al. | 29/595 |
| 7,015,060 B1 * | 3/2006 | Kubena et al. | 438/50 |
| 2003/0217915 A1 * | 11/2003 | Ouellet et al. | 204/192.15 |
| 2003/0230798 A1 * | 12/2003 | Lin et al. | 257/704 |
| 2004/0016995 A1 * | 1/2004 | Kuo et al. | 257/678 |
| 2004/0077117 A1 * | 4/2004 | Ding et al. | 438/51 |
| 2004/0099909 A1 * | 5/2004 | Park et al. | 257/347 |
| 2004/0237626 A1 * | 12/2004 | Challoner et al. | 73/1.38 |
| 2005/0054133 A1 * | 3/2005 | Felton et al. | 438/50 |

OTHER PUBLICATIONS

Milanovic, V., et al., "A Simple Process for Lateral Single Crystal Silicon Nanowires," *Proceedings of IMECE '02, ASME International Mechanical Engineering Congress & Exposition,* New Orleans, Louisiana, pp. 1-7 (Nov. 17-22, 2002).

Milanovic, V, et al., "Deep Reactive Ion Etching for Lateral Field Emission Devices," *IEEE Electron Device Letters,* vol. 21, No. 6, pp. 271-273 (Jun. 2000).

Tang, T.K., et al., "Silicon Bulk Micromachined Vibratory Gyroscope," *Solid-State Sensor and Actuator Workshop,* Hilton Head, South Carolina, pp. 288-293 (Jun. 2-6, 1996).

Via, A., et al., "Metal Lift-Off on InP HBTs Using Carbon Dioxide Snow Spray," INTERNET: http://www1.boc.com/eco-snow/pdf/CS-MAX%202002.pdf.

U.S. Appl. No. 11/008,715, filed Dec. 8, 2004, Kubena.

U.S. Appl. No. 11/008,721, filed Dec. 8, 2004, Kubena et al.

* cited by examiner

Figure 4a
B
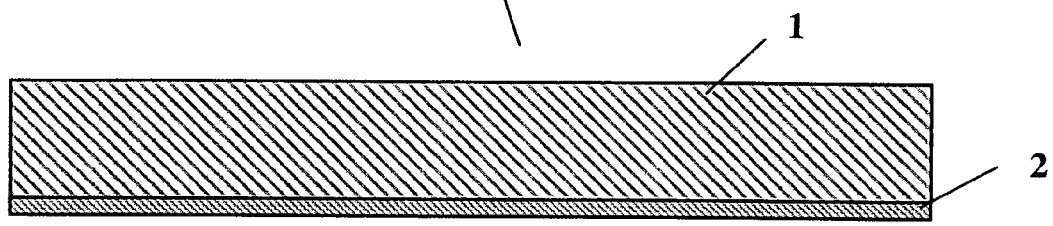
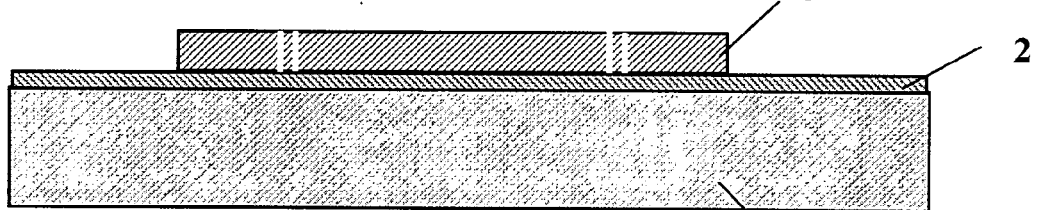
Figure 4b
A

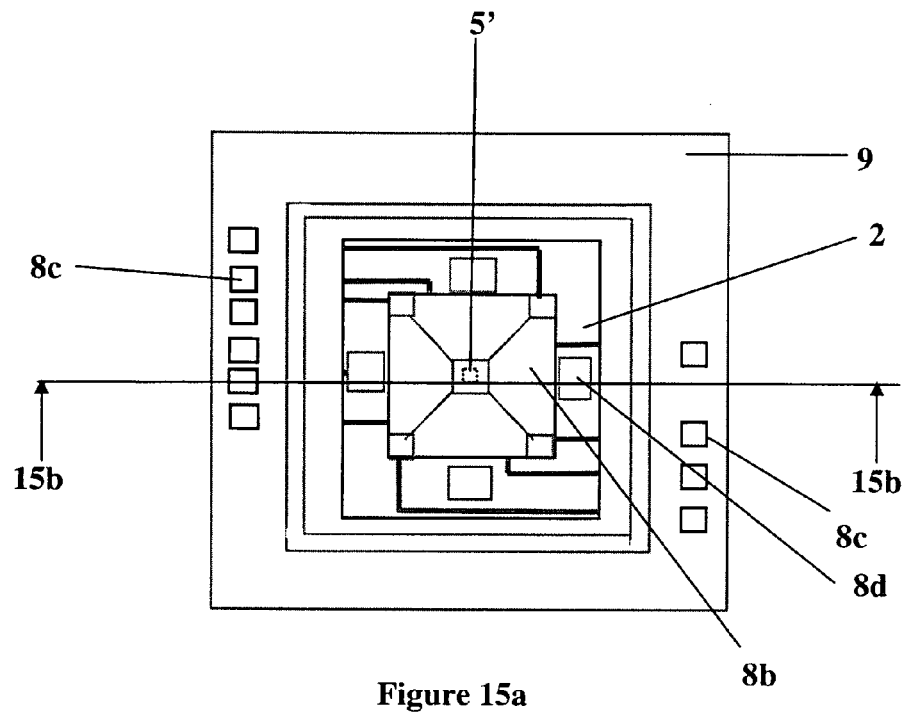
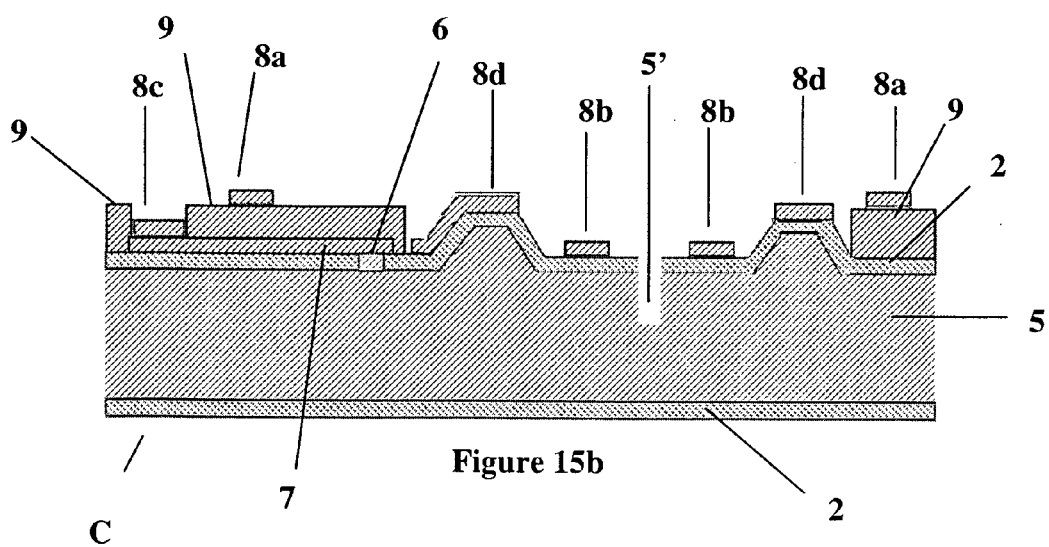
Figure 15a
Figure 15b

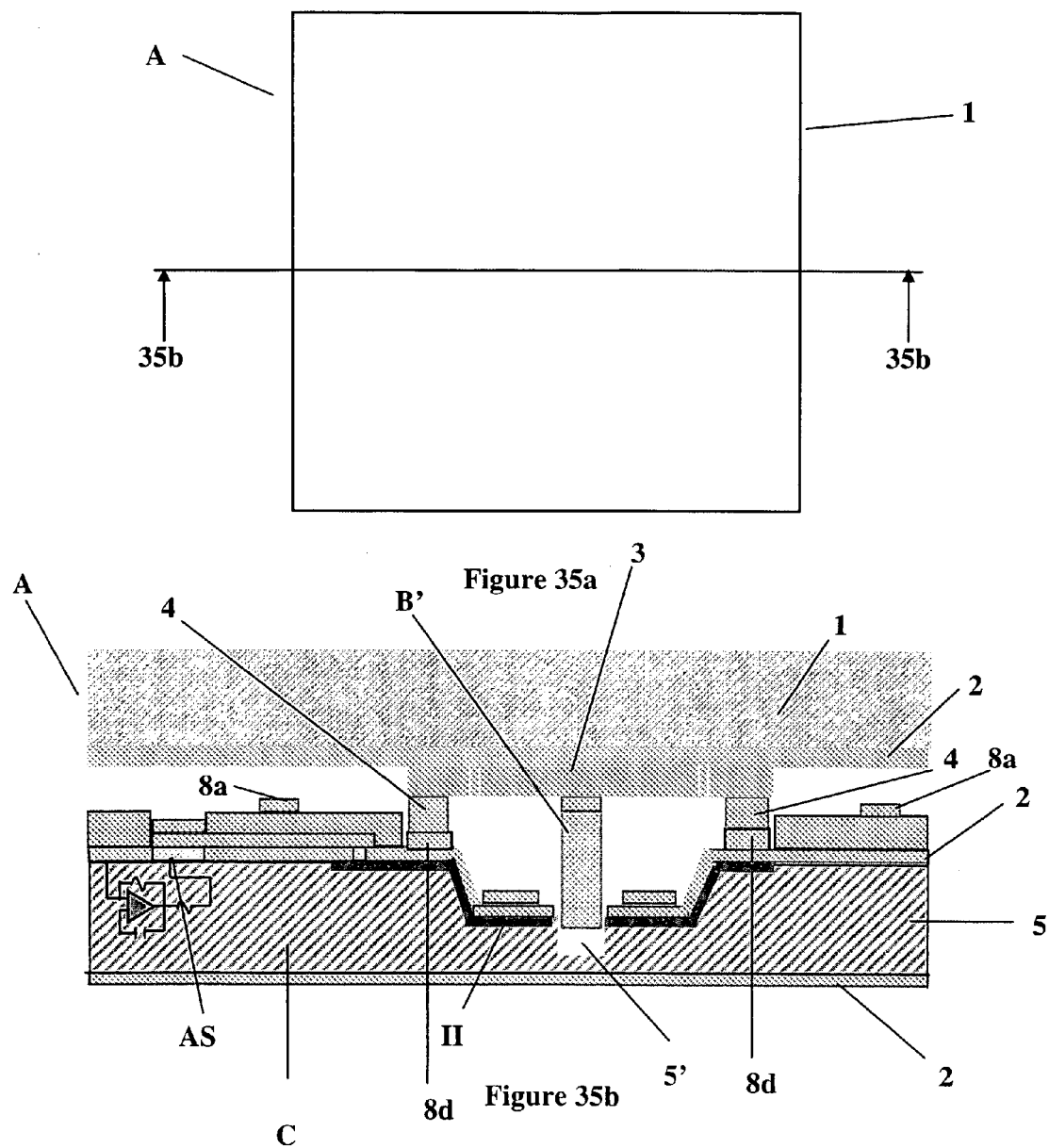

METHOD OF MANUFACTURING A CLOVERLEAF MICROGYROSCOPE AND CLOVERLEAF MICROGYROSCOPE

BACKGROUND OF THE INVENTION

1. Field of the Invention

The present invention refers to a cloverleaf microgyroscop and a method of manufacturing a cloverleaf microgyroscop that contains a single crystal silicon cloverleaf-shaped resonator and integrated post attached to the leaves.

2. Description of Related Art

U.S. Pat. No. 5,894,090 to Tang et al., which is incorporated herein as reference, discloses a micromachined symmetric leaf structure having a plurality of symmetrically disposed leaves about a defined center. At least one micromachined spring symmetrically is disposed with respect to the symmetric leaf structure and supporting the symmetrical leaf structure, a rim/base structure to which the spring is coupled. The rim/base structure includes a plurality of sensing and drive electrodes and a circuit electrically coupled to the electrodes included within the rim/base structure. The circuit provides drive signals to the drive electrodes to oscillate the symmetric leaf structure and to receive a sensing signal from the sensing electrodes to detect response of the oscillating symmetric leaf structure to physical phenomena exterior to the micromachined resonator. The micromachined resonator has a manually inserted post. It shows a lack of a silicon based vacuum encapsulation. A low yield is obtained during the separation. The manufacturing of the resonator involves high fabrication costs. It shows large vibration sensitivity and no clear path to electronic integration.

The known manufacture processes make it very difficult to manufacture a micro gyroscope. The central post is inserted by hand, the device has to be vacuum packaged in a custom package and there is no ability to integrate control electronics with the silicon structure.

What is needed is a cloverleaf microgyroscope and a process for manufacturing a cloverleaf microgyroscope with an integrated central post and electronics with the resonator and vacuum package at wafer-level with a single crystal silicon construction.

BRIEF SUMMARY OF THE INVENTION

This invention addresses the above needs.

One aspect of the present invention is a method of manufacturing a cloverleaf microgyroscope containing an integrated post comprising:
  a) attaching a post wafer to a resonator wafer,
  b) forming a bottom post from the post wafer being attached to the resonator wafer,
  c) attaching the resonator wafer to a base wafer, wherein the bottom post fits into a post hole in the base wafer,
  d) forming a top post from the resonator wafer, wherein the bottom and top post are formed symmetrically around the same axis, and
  e) attaching a cap wafer on top of the base wafer.

Another aspect of the present invention is a cloverleaf microgyroscope with off-chip electronics manufactured by this method.

In one embodiment, the construction of a microgyroscope has a single crystal silicon cloverleaf-shaped resonator and integrated post attached to the leaves. The microgyroscope device array is fabricated by bonding two separate substrates together using a gold/gold thermo compression technique; one contains the cloverleaf resonator structures fabricated from SOI and bulk silicon substrates, and the other contains the support pillars and electrode metal. A fourth wafer containing an array of etched cavities and openings which allow the bonding of electrical wires from metal pads to off-chip circuitry is solder-bonded to the device wafer in a vacuum, thus hermetically sealing each individual microgyroscope.

Another aspect of the present invention is a method of manufacturing a cloverleaf microgyroscope containing an integrated post comprising:
  a) attaching a post wafer to a resonator wafer,
  b) forming a bottom post from the post wafer being attached to the resonator wafer,
  c) application specific integrated circuits (ASIC) electronics on a base wafer
  d) attaching the resonator wafer to the base wafer, wherein the bottom post fits into a post hole in the base wafer,
  e) forming a top post from the resonator wafer, wherein the bottom and top post are formed symmetrically around the same axis,
  f) and attaching a cap wafer on top of the base wafer.

Another aspect of the present invention is a cloverleaf microgyroscope with on-chip electronics manufactured by this method.

In another embodiment, the construction of a microgyroscope with on-chip electronics has a single crystal silicon cloverleaf-shaped resonator and integrated post attached to leaves. The microgyroscope with on-chip electronics device array is fabricated by bonding two separate substrates together using a gold/gold thermo compression technique; one includes the cloverleaf resonator structures fabricated from SOI and bulk silicon substrates.

In another embodiment, the present invention relates to a fabrication method that incorporates an integrated post, which eliminates a manual post insertion process. In addition, a wafer-scale packaging can be used to facilitate die separation and to enhance the quality factor of the mechanical resonator. The method of the present invention increases the yield and decreases the manufacturing costs of the cloverleaf gyroscope. The on-chip integration according to an aspect of the present invention of the control electronics with the gyroscope will further decrease the cost and size of the device.

BRIEF DESCRIPTION OF THE SEVERAL VIEWS OF THE DRAWINGS

These and other features, aspects and advantages of the present invention will become better understood with reference to the following description, appended claims, and accompanying drawings where Cloverleaf Microgyroscope

FIG. 4a is a cross-sectional view at line 3b—3b of the bond wafer B;

FIG. 4b is a cross-sectional view at line 2b—2b of bonded to wafer A;

FIG. 15a is a top plan view of the preferred starting material of the base 15b—15b of the base wafer C after a post hole etch is carried out in the base wafer C;

Cloverleaf Microgyroscope with On-Chip Electronics

Figure 16A:
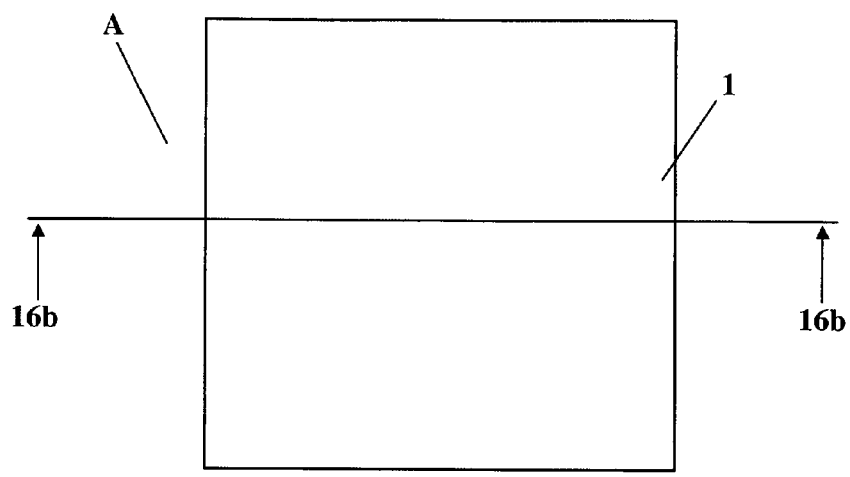
FIG. 16a is a top plan view of the preferred starting material of the bottom surface of wafer A and FIG. 16b is a cross-sectional view through the base wafer A, post B', and base wafer C of FIG. 16a at line 16b—16b of the base wafer A, post B', and base wafer C.
Figure 25A:
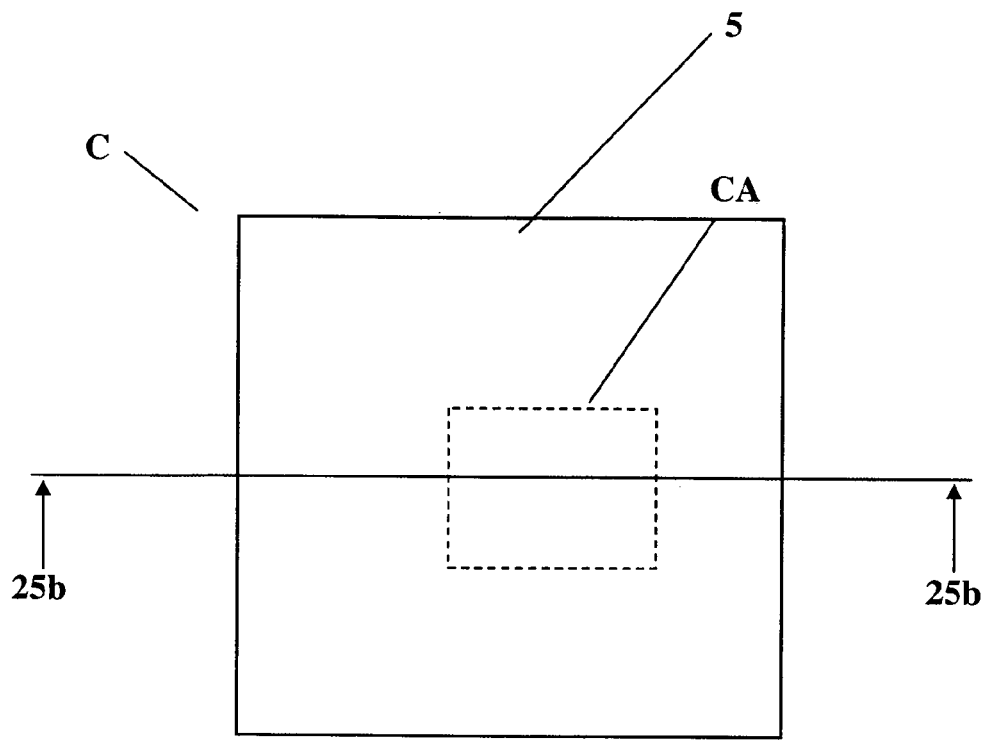
Figure 25B:
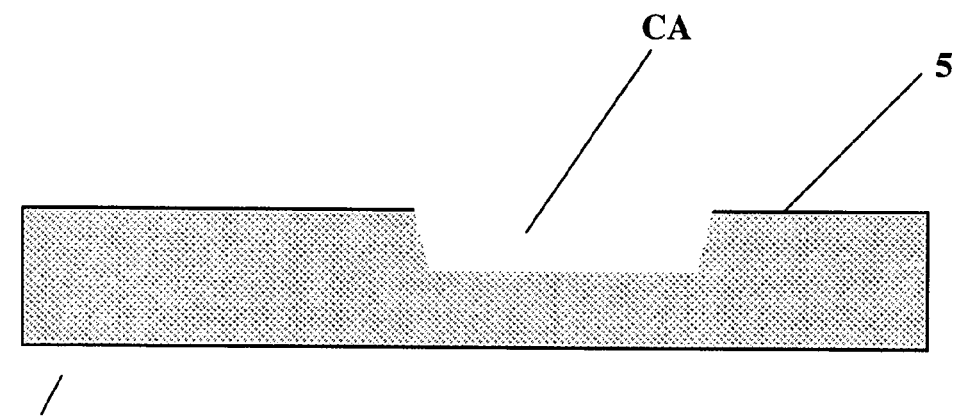
Figure 26A:
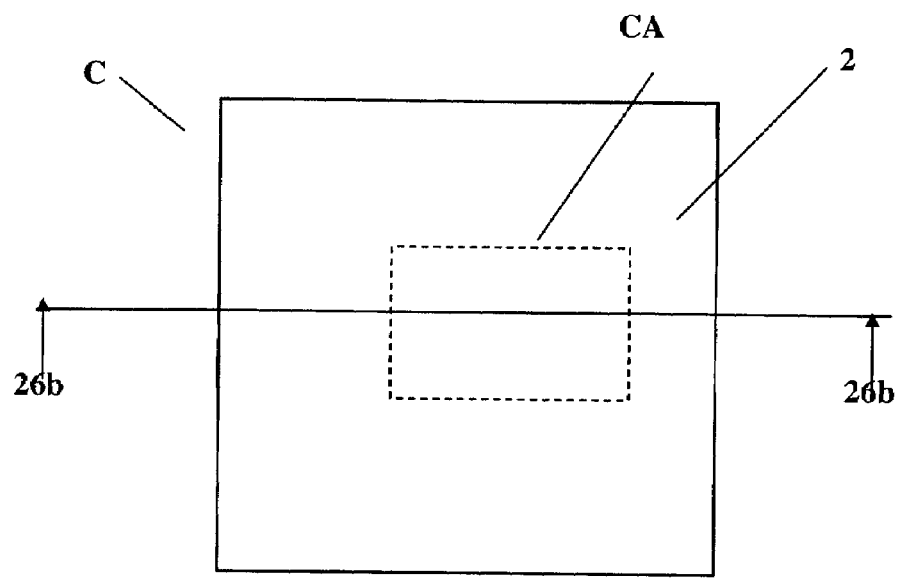
Figure 26B:
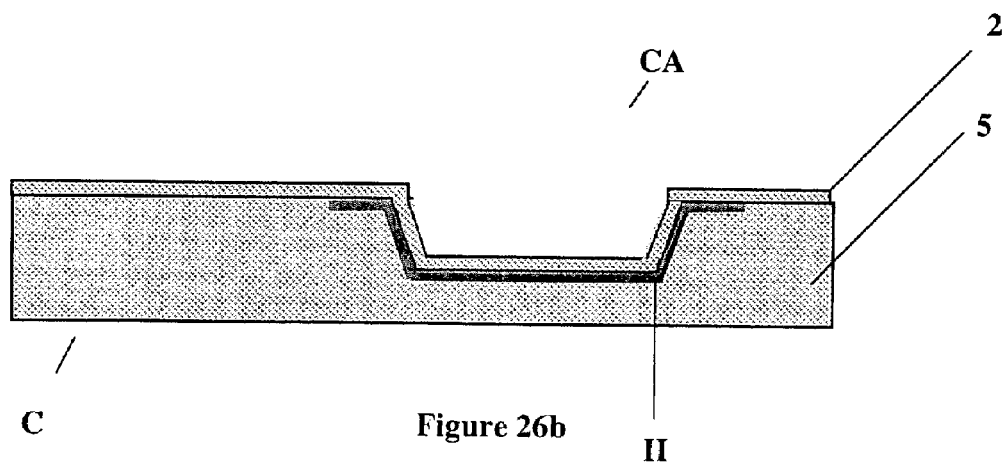
Figure 27A:
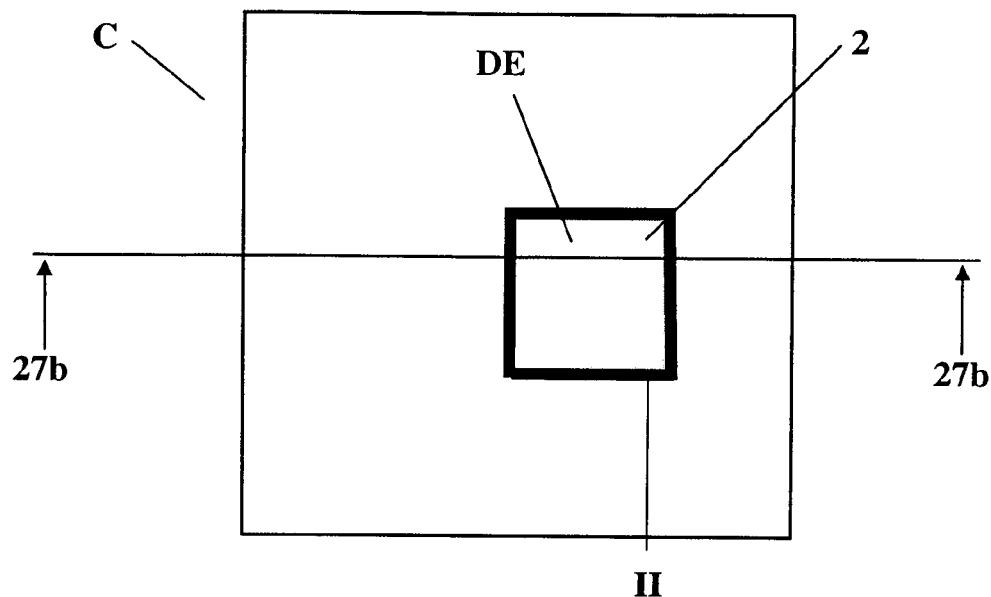
Figure 27B:
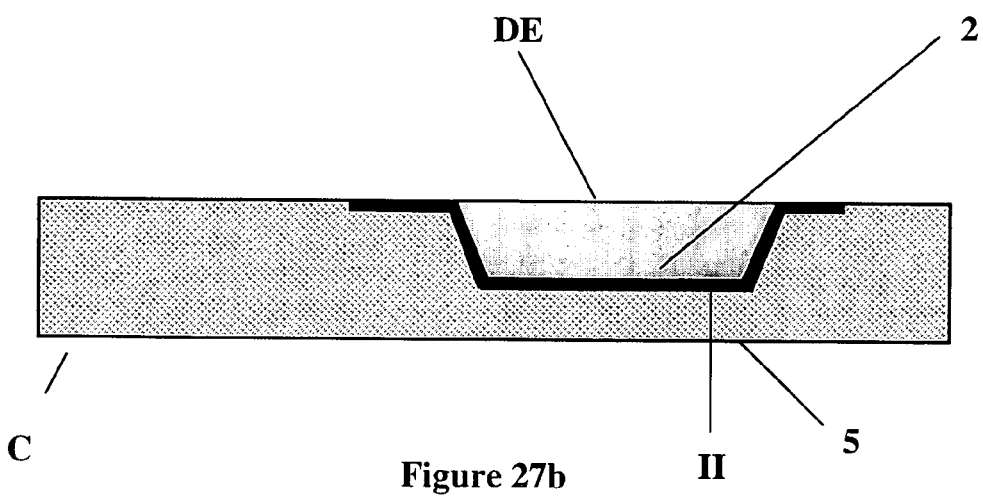
Figure 28A:
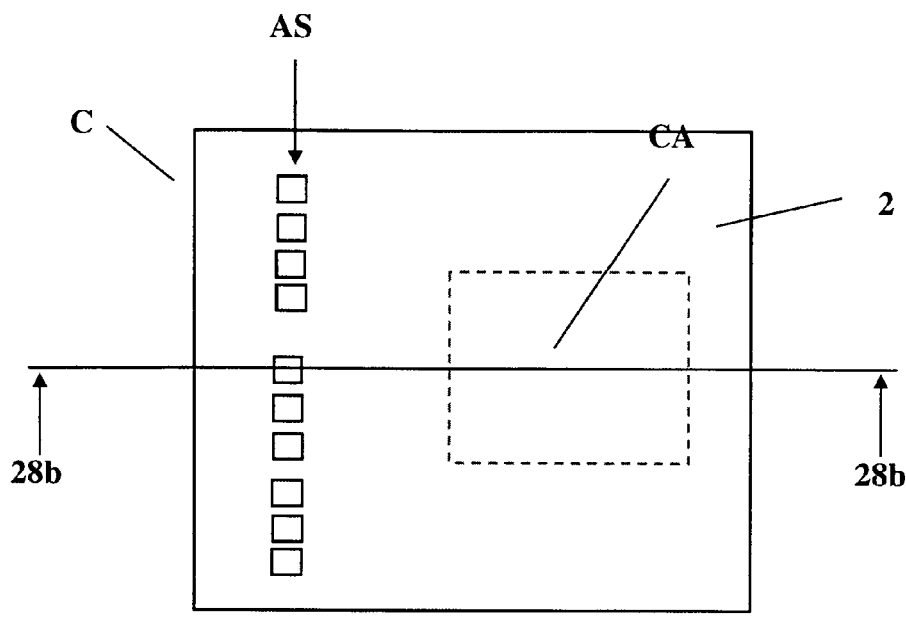
Figure 28B:
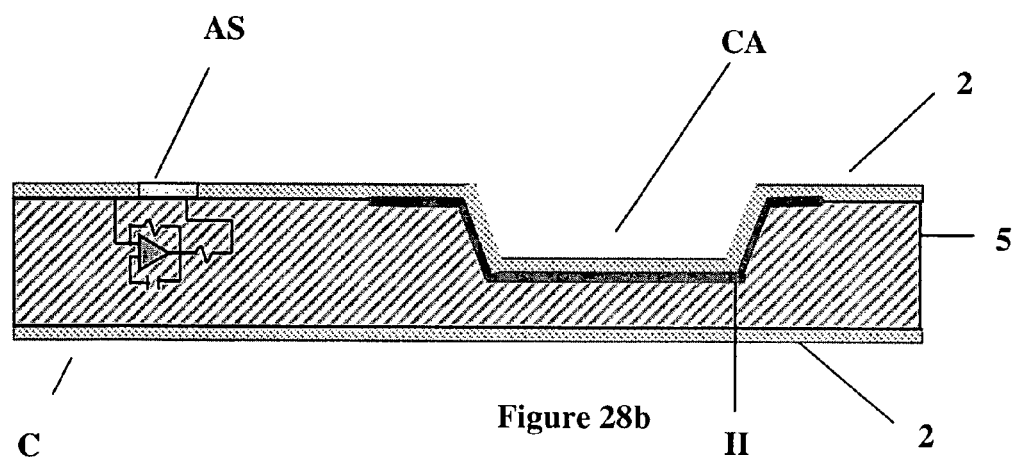
Figure 29A:
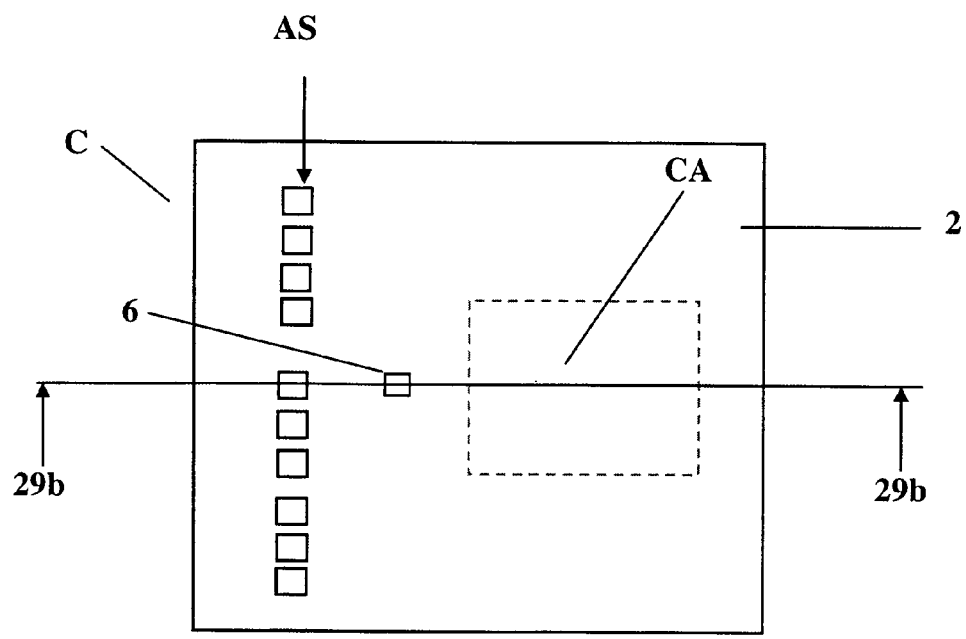
Figure 29B:
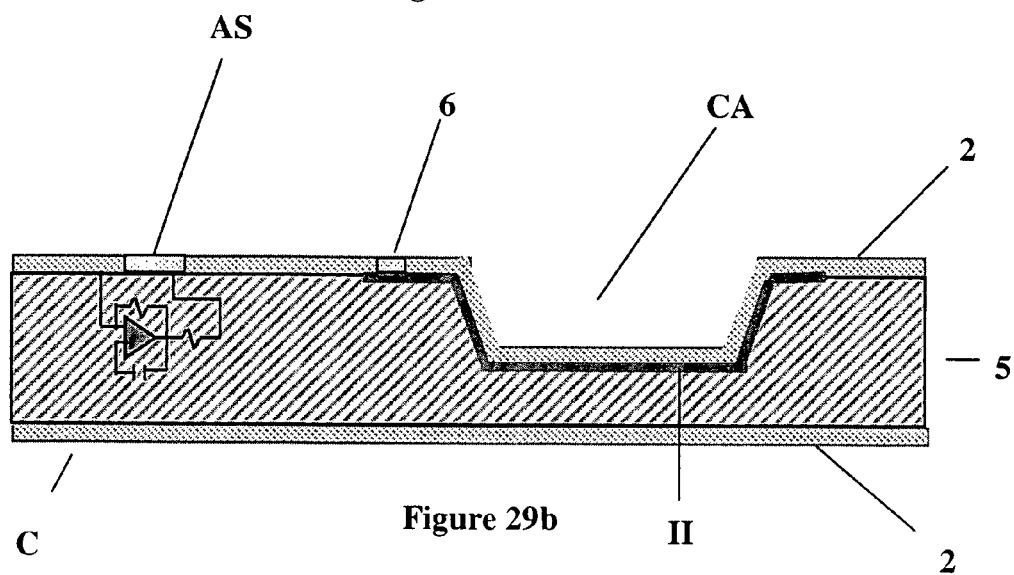
Figure 30A:
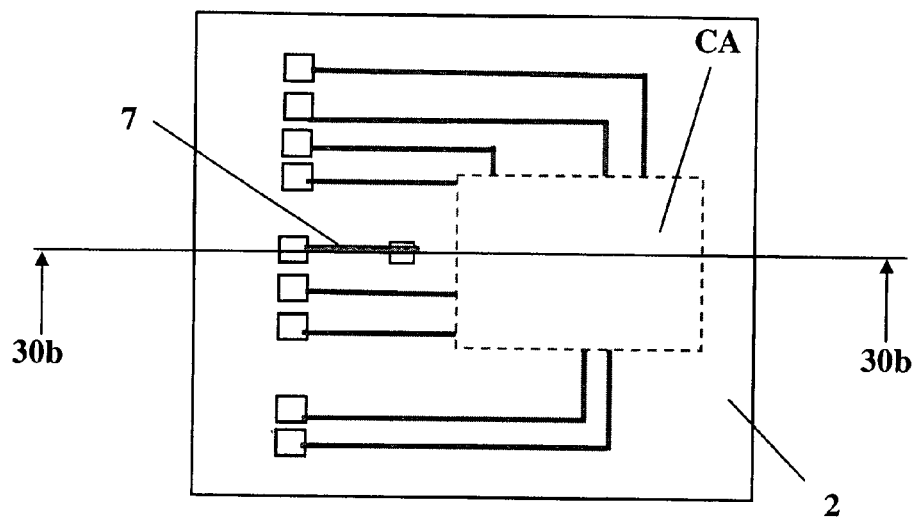
Figure 30B:
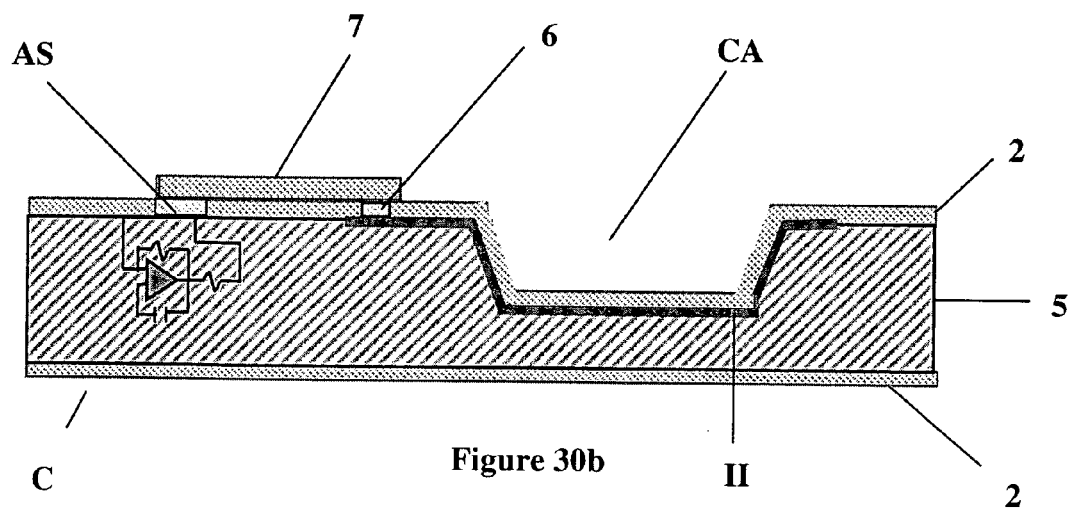
Figure 31A:
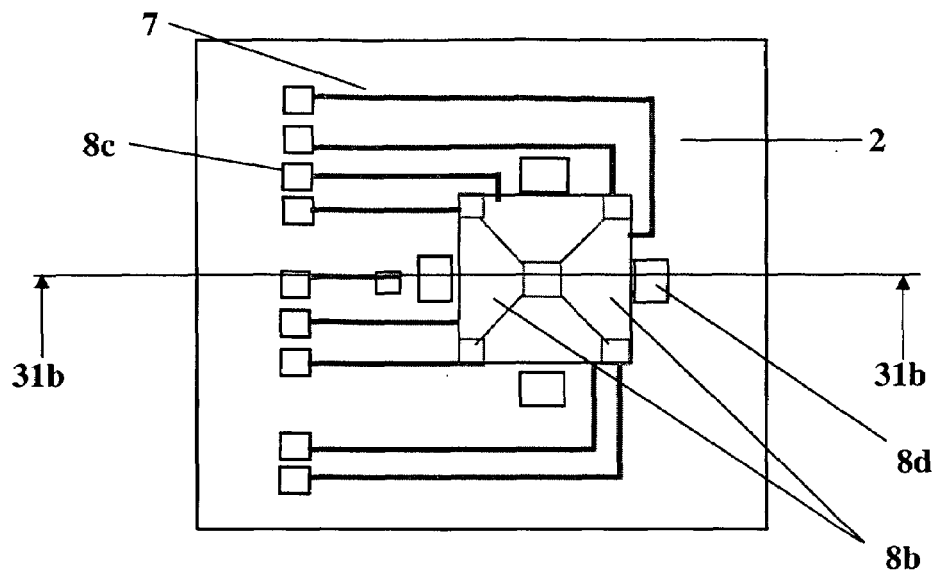
Figure 31B:
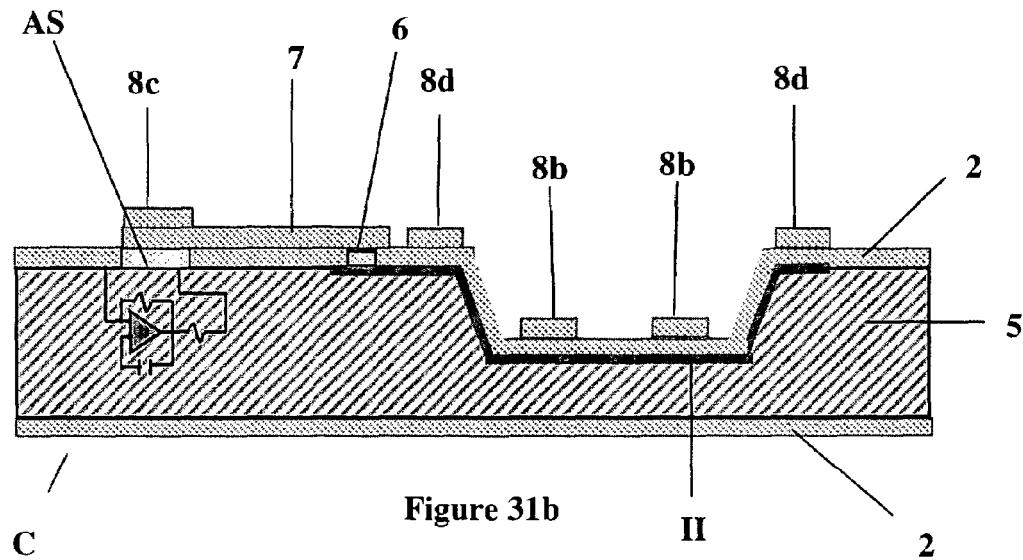
Figure 32A:
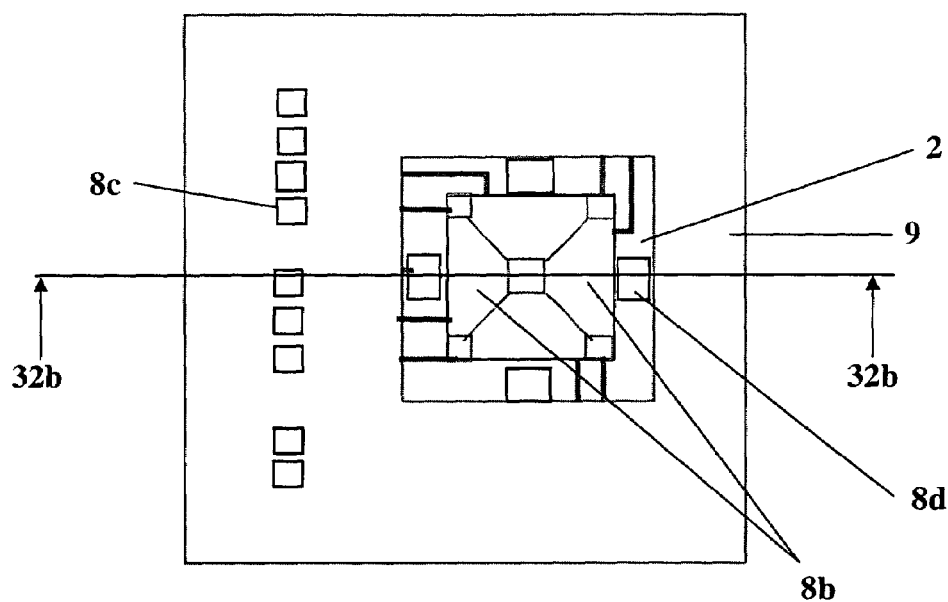
Figure 32B:
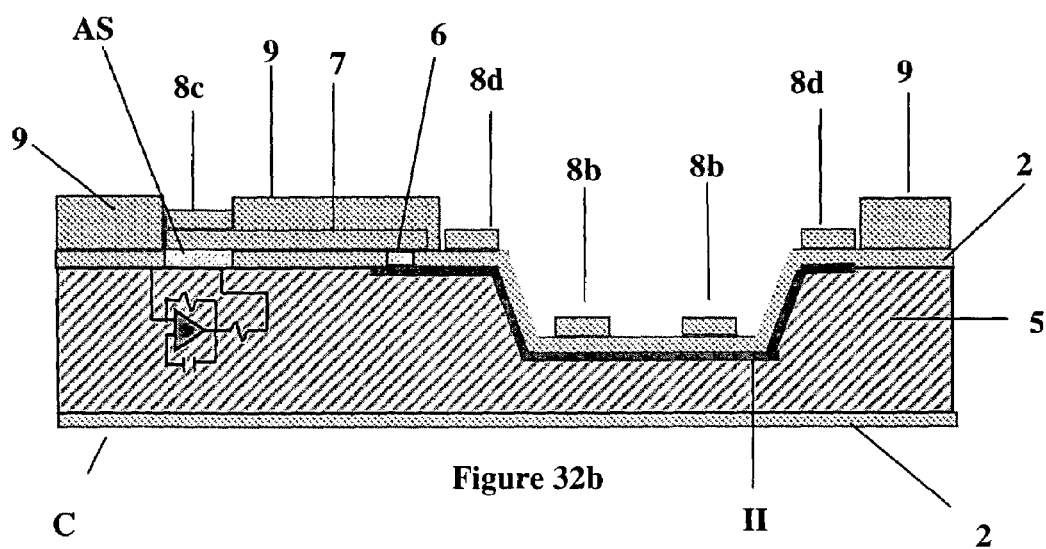
Figure 33A:
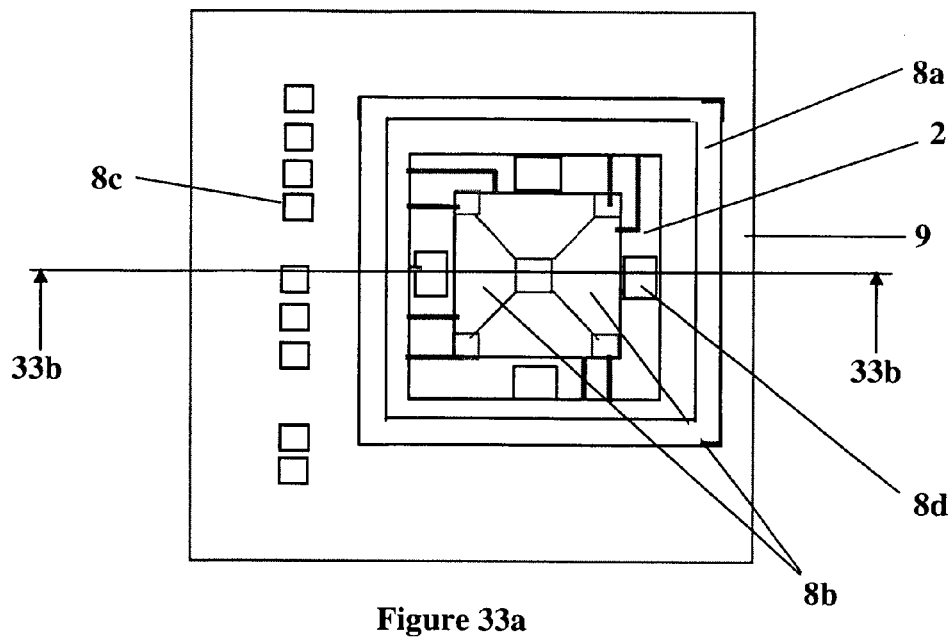
Figure 33B:
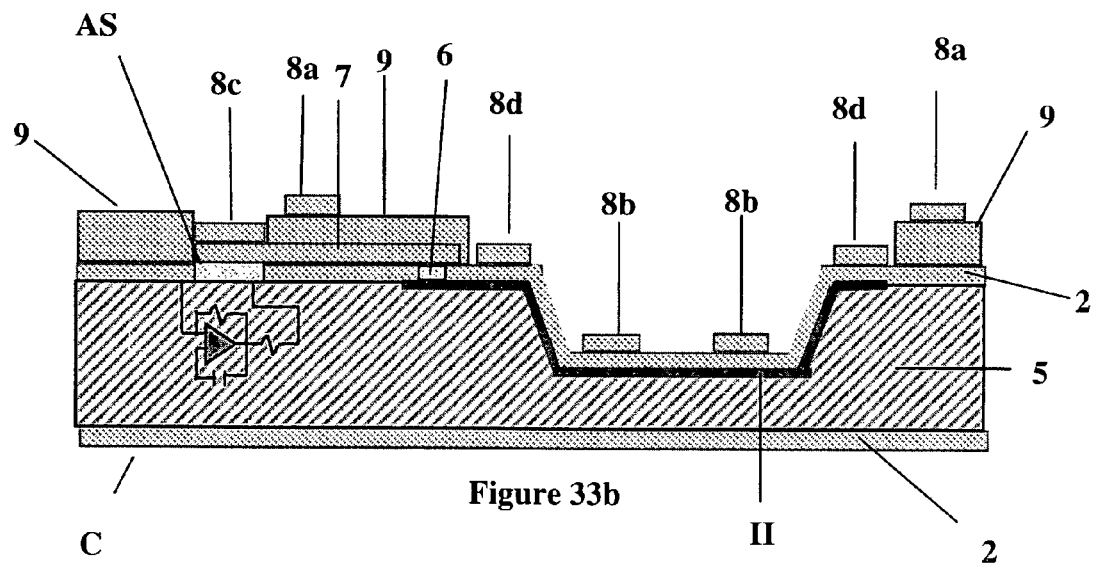
Figure 34A:
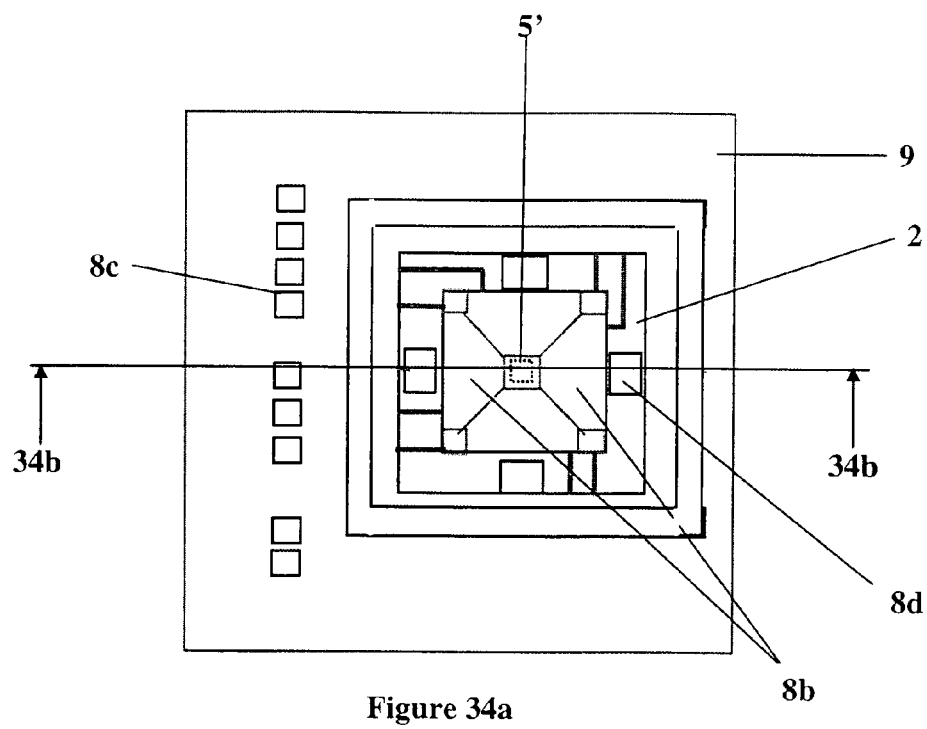
Figure 34B:
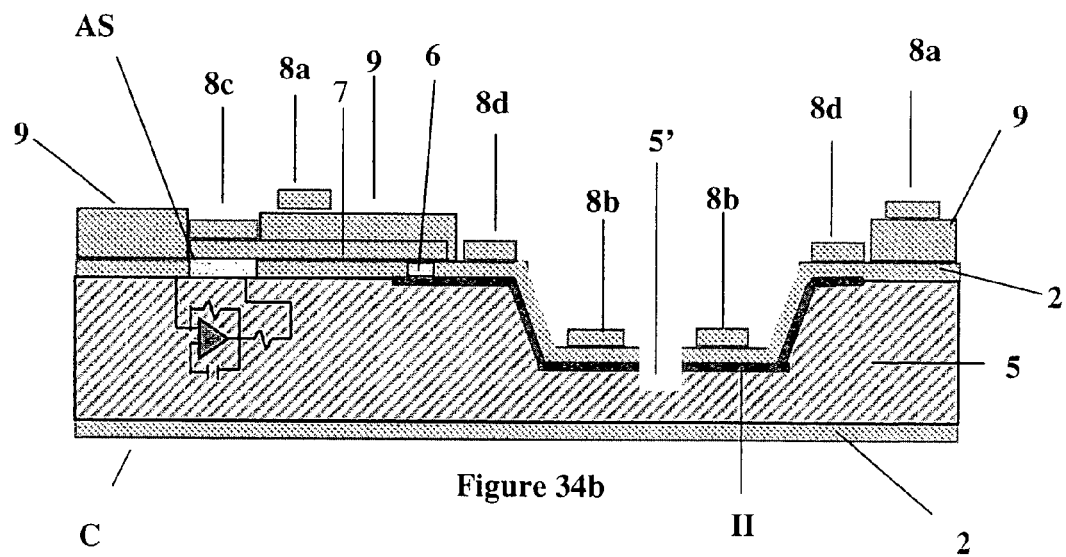
Figure 36A:
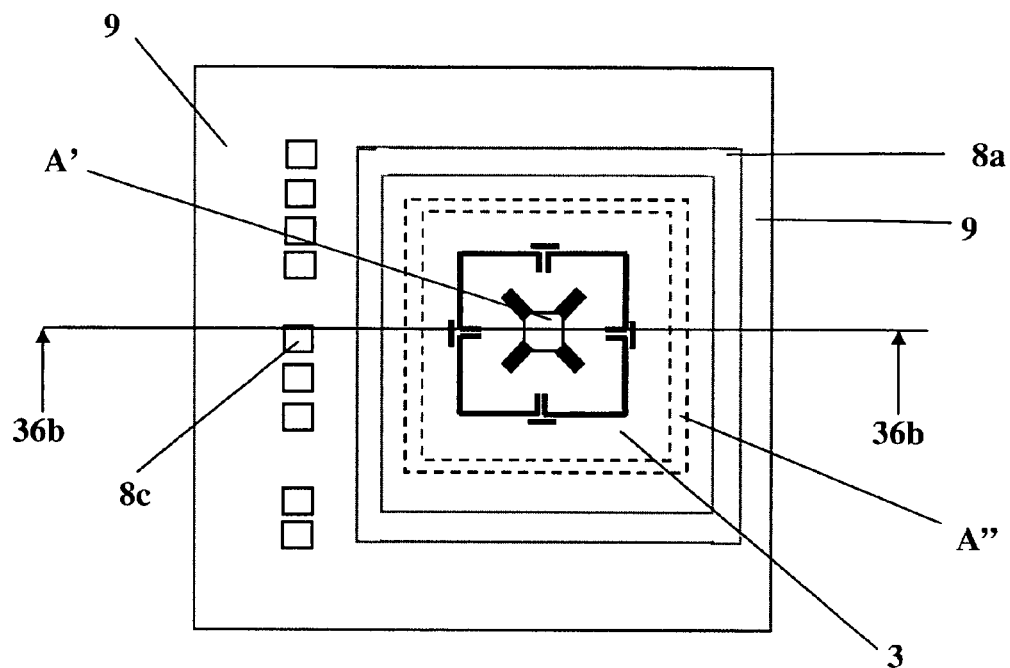
Figure 36B:
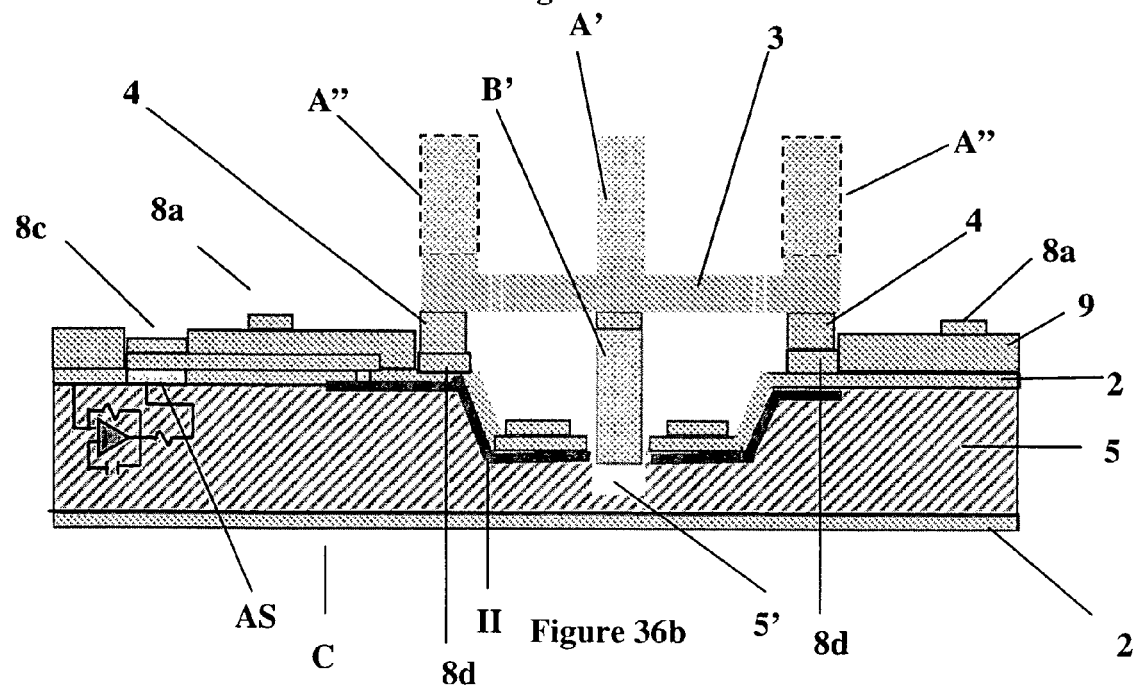
Figure 37A:
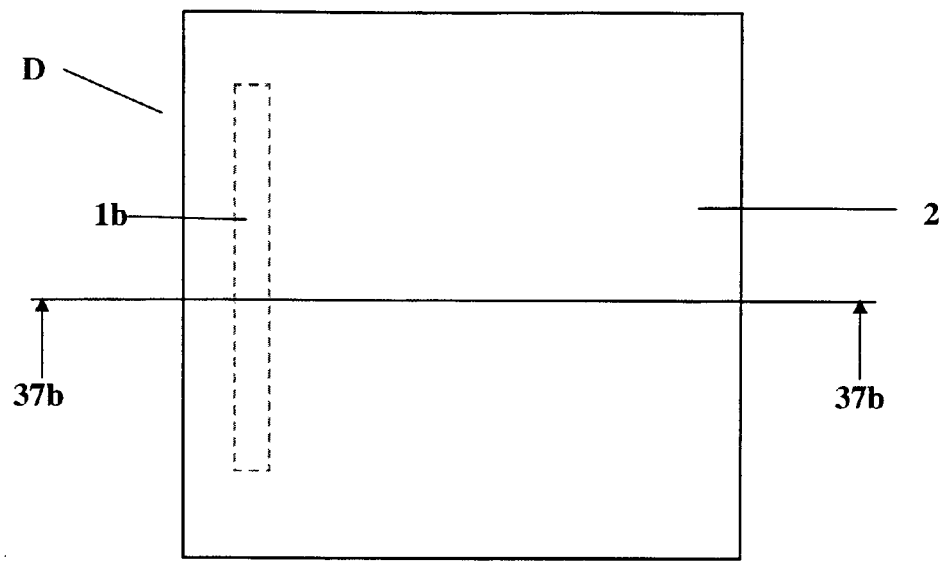
Figure 37B:
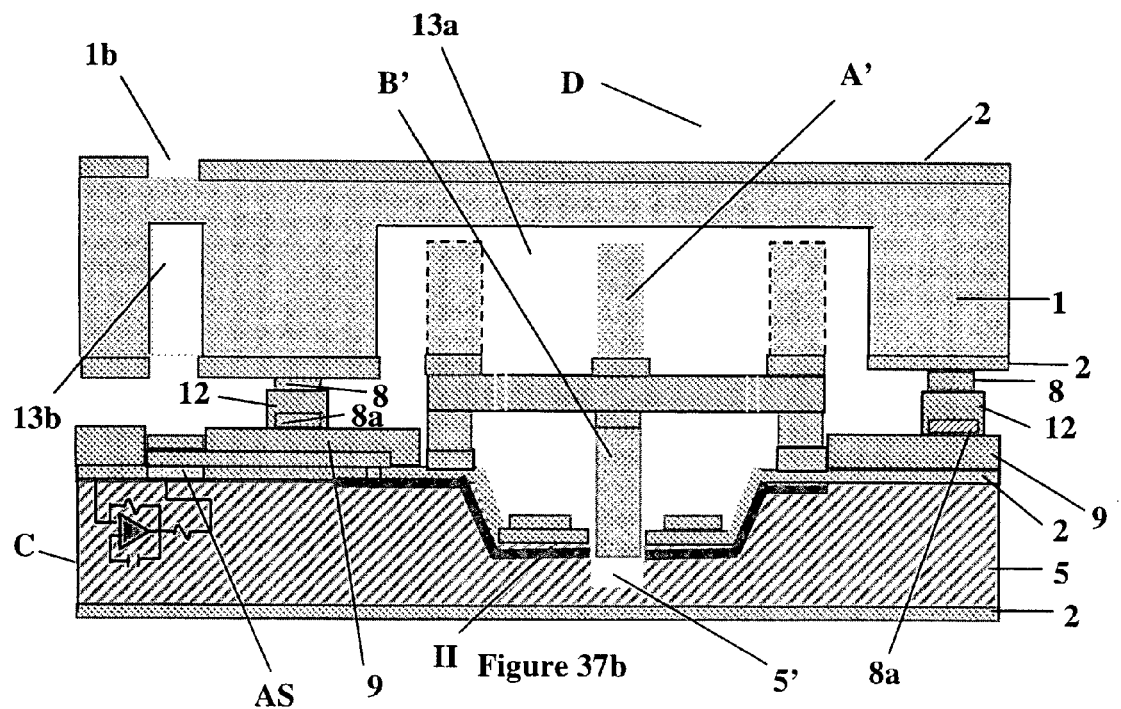
Figure 38A:
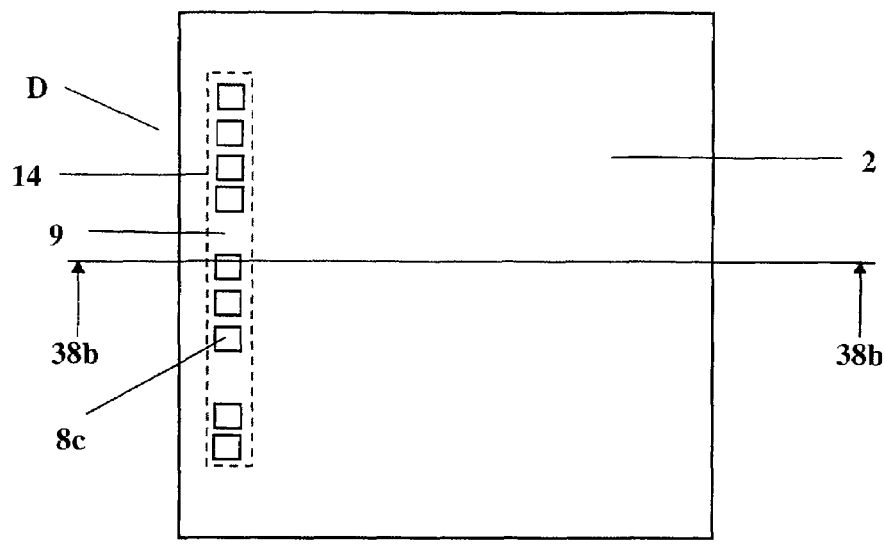
Figure 38B:
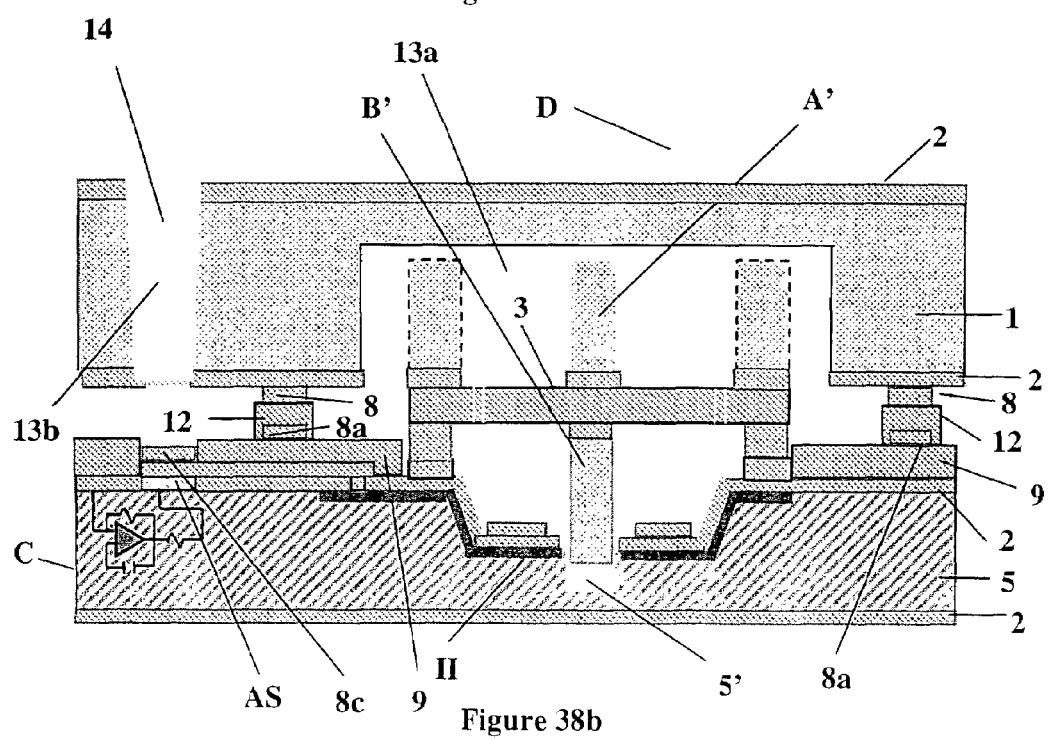
Figure 39A:
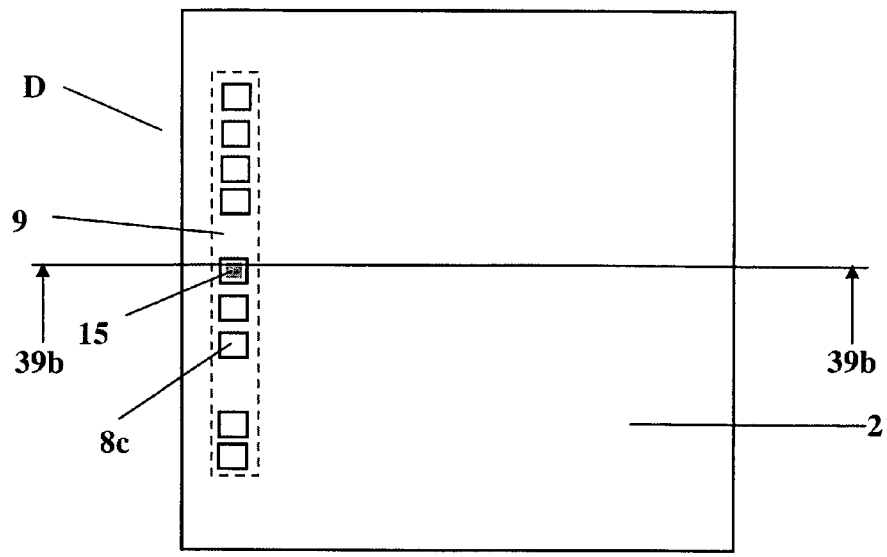
Figure 39B:
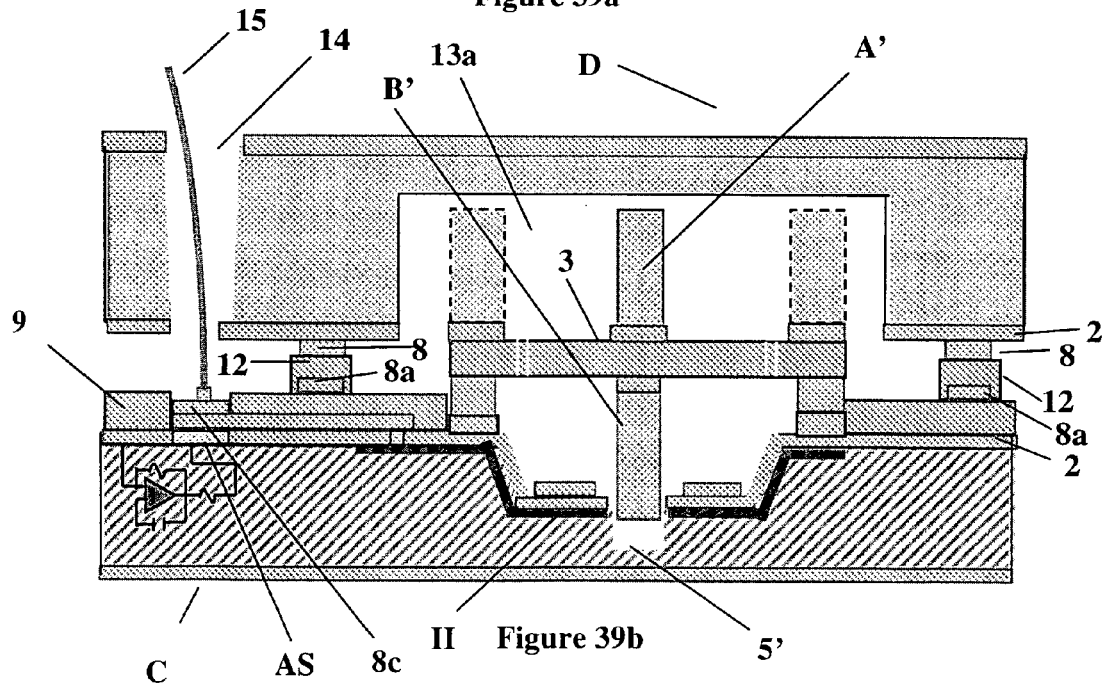

FIG. 25a is a top plan view of the preferred starting material of a base wafer C and FIG. 25b is a cross-sectional view through base wafer C of FIG. 25a at line 25b—25b of the base wafer C after a cavity formation;

FIG. 26a is a top plan view of the preferred starting material of a base wafer C and FIG. 26b is a cross-sectional view through base wafer C of FIG. 26a at line 26b—26b of the base wafer C after ion implantation and thermal oxidation;

FIG. 27a is a top plan view of the preferred starting material of a base wafer C and FIG. 27b is a cross-sectional view through base wafer C of FIG. 27a at line 27b—27b of the base wafer C after a cavity planarization;

FIG. 28a is a top plan view of the preferred starting material of a base wafer C and FIG. 28b is a cross-sectional view through base wafer C of FIG. 28a at line 28b—28b of the base wafer C after ASIC electronic fabrication;

FIG. 29a is a top plan view of the preferred starting material of a base wafer C and FIG. 29b is a cross-sectional view through base wafer C of FIG. 29a at line 29b—29b of the base wafer C after the ohmic contact metal patterning and deposition;

FIG. 30a is a top plan view of the preferred starting material of a base wafer C and FIG. 30b is a cross-sectional view through base wafer C of FIG. 30a at line 30b—30b of the base wafer C after interconnect metal patterning and deposition;

FIG. 31a is a top plan view of the preferred starting material of a base wafer C and FIG. 31b is a cross-sectional view through base wafer C of FIG. 31a at line 31b—31b of the base wafer C after electrode metal deposition and patterning;

FIG. 32a is a top plan view of the preferred starting material of a base wafer C and FIG. 32b is a cross-sectional view through base wafer C of FIG. 32a at line 32b—32b of the base wafer C after a dielectric layer deposition and patterning;

FIG. 33a is a top plan view of the preferred starting material of a base wafer C and FIG. 33b is a cross-sectional view through base wafer C of FIG. 33a at line 33b—33b of the base wafer C after providing a seal ring metal;

FIG. 34a is a top plan view of the preferred starting material of a base wafer C and FIG. 34b is a cross-sectional view through base wafer C of FIG. 34a at line 34b—34b of the base wafer C after a post hole etch is carried out in the base wafer C;

FIG. 35a is a top plan view of the preferred starting material of the bottom surface of wafer A and FIG. 35b is a cross-sectional view through the wafer A, post B', and base wafer C of FIG. 16a at line 16b—16b of the wafer A, post B', and base wafer C;

FIG. 36a is a top plan view depicting post A' and base wafer C and FIG. 36b is a cross-sectional view through of post A', post B', and base wafer C FIG. 36a at line 36b—36b depicting post A', post B', and base wafer C after post formation;

FIG. 37a is a top plan view of the preferred starting material of a cap wafer D and FIG. 37b is a cross-sectional view through the cap wafer D bonded to the base wafer C of FIG. 37a at line 37b—37b of the cap wafer D bonded to the base wafer C;

FIG. 38a is a top plan view of the preferred starting material of a cap wafer D and FIG. 38b is a cross-sectional view through the cap wafer D bonded to the base wafer C of FIG. 38a at line 38b—38b of the cap wafer D bonded to the base wafer C after etching remaining silicon in the cap wafer D;

FIG. 39a is a top plan view of the preferred starting material of a cap wafer D and FIG. 39b is a cross-sectional view through the cap wafer D bonded to the base wafer C of FIG. 39a at line 39b—39b of the cap wafer D bonded to the base wafer C after dicing and ball-bonding of wires.

DETAILED DESCRIPTION OF THE INVENTION

Cloverleaf Microgyroscope

Figure 1A:
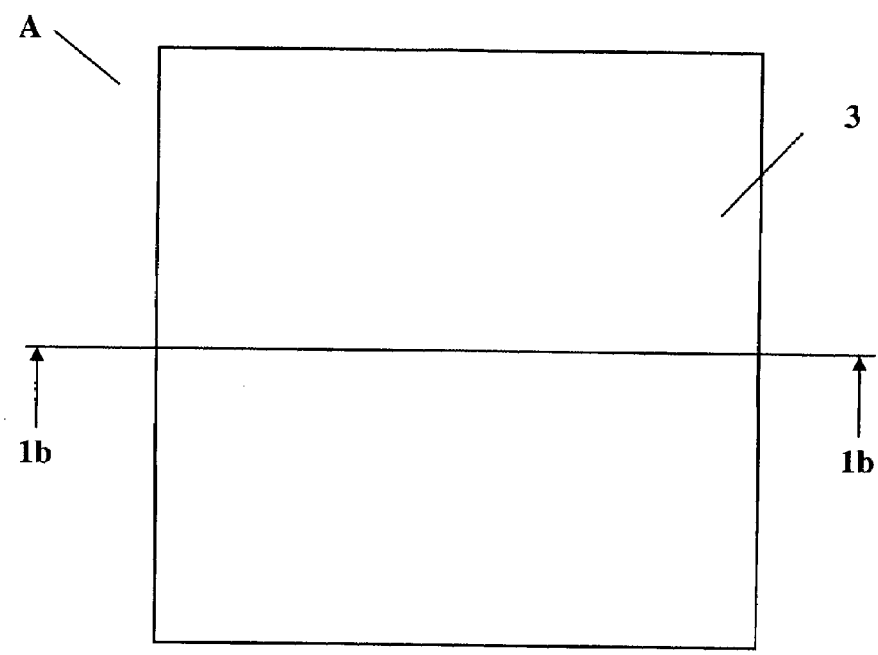
FIG. 1a is a top plan view of the preferred starting material of a resonator SOI wafer A and FIG. 1b is a cross-sectional view through wafer A of FIG. 1a at line 1b—1b of the resonator SOI wafer A.
Figure 1B:
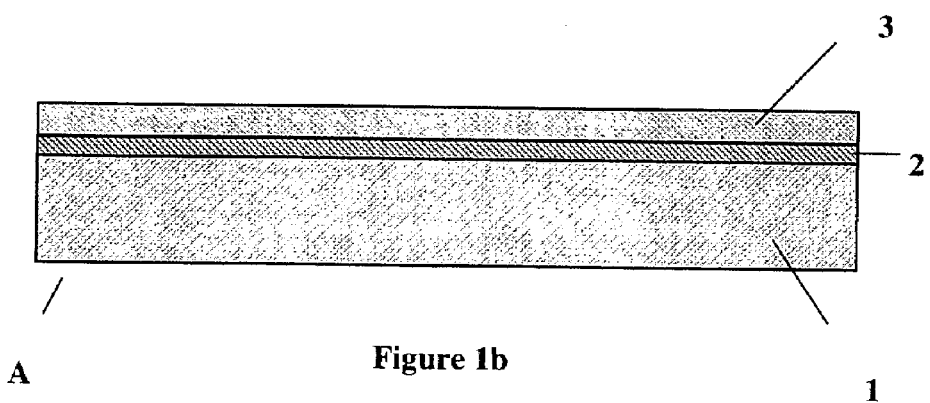

The resonator wafer A, preferably a silicon-on-insulator (SOI) wafer, is preferably prepared first. On a bulk silicon base 1 having a preferable thickness of $\leq 500$ µm, which is optionally lightly-doped bulk silicon about 1e15 cm$^{-3}$, a silicon dioxide layer 2 having a preferable thickness of $\leq 2$ µm is formed preferably by thermal oxidation at a temperature between 800° C. and 1000° C. On top of the silicon dioxide layer 2 a heavily doped silicon epi-layer, p-type, 1e19-1e20 cm$^{-3}$ 3 is provided having a preferable thickness of 10 µm to 20 µm, as shown in FIGS. 1a and 1b.

Figure 2A:
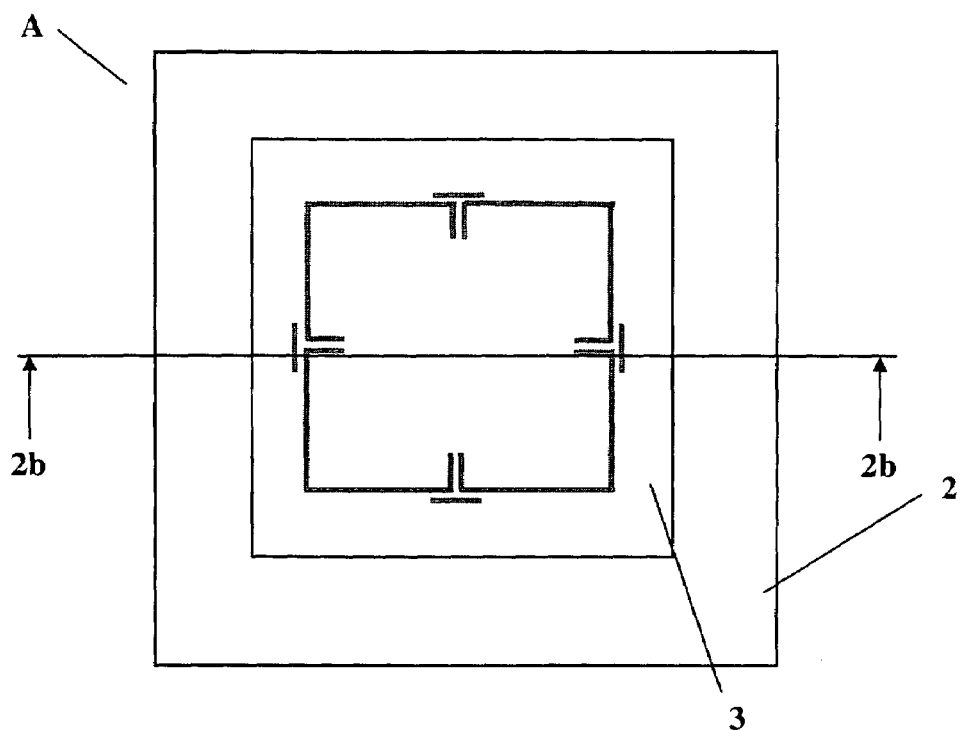
FIG. 2a is a top plan view of the preferred starting material of a resonator SOI wafer A and FIG. 2b is a cross-sectional view through wafer A of FIG. 2a at line 2b—2b of the resonator SOI wafer A.
Figure 2B:
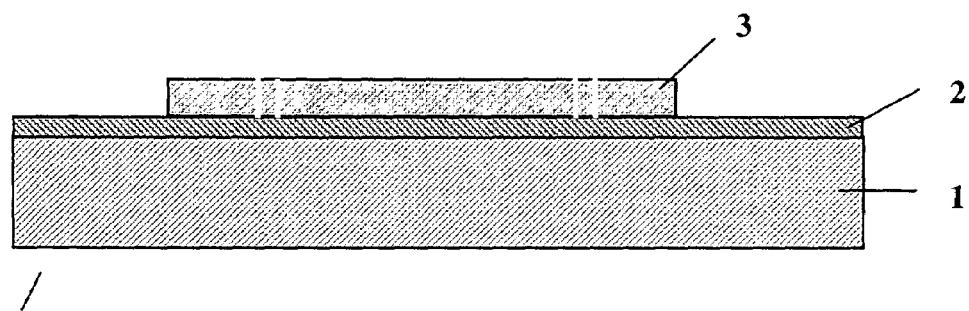

Then the cloverleaf petal and spring of the resonator wafer A is prepared. Parts of the heavily-doped silicon epi-layer 3 are removed by photo resist lithography, deep reactive ion etching (DRIE) and photo resist removal, as shown in FIG. 2a. Photo resist lithography and DRIE are described in inter alia Veljko Milanovic et al. "Deep Reactive Ion Etching for Lateral Field Emission Devices", IEEE Electron Device Letters, Vol. 21, No. 6, June, which is incorporated herein as reference.

The process preferably comprises:
1. The top silicon layer of the wafer is coated with a layer of photoresist.
2. Light from an illuminator is projected through a mask that contains the pattern to be created on the wafer. That light patterns that pass through the mask are projected onto the photoresist-coated layer.
3. The photoresist that is exposed to the light becomes soluble and is rinsed away, leaving miniature images of the mask pattern. It remains an etch mask on the silicon surface of the wafer.
4. Regions unprotected by photoresist are etched by gases utilizing Deep Reactive Ion Etching (DRIE). DRIE involves repeated exposure of a photoresist-masked silicon wafer to an etchant (usually $SF_6$) plasma in alternation with a passivant (usually $C_4F_8$) plasma. So the etching process preferably cycles between etching and deposition steps several times to achieve a deep etching with a quite vertical profile. The etch rate, profile and selectivity to the mask are controlled by adjusting etch and passivation steps efficiency or the time ratio of the two steps. Average etch rate is around 2.7 µm/min, and etching is terminated when the $SiO_2$ layer 2 is reached. The $SiO_2$ layer 2 serves as a stop layer.
5. After the DRIE process the photoresist is removed. Photoresist removal with solvents is a preferred process in the semiconductor manufacturing and is used extensively after any metal processing. Organic strippers may have any number of different components such as NMP, glycol ether, amine, and DMSO.

The process parameters for the photoresist lithography are preferably as follows:
a) Resist Application.
  2.07 µm
  AZI 1350J, 3500 RPM
  100° C. Hotplate bake for 45 sec.
b) Resist Exposure
  Photomask # C1
  Time=7 sec.
  Mask Offset=0.2 µm
c) Develop & Bake:
  MF351:$H_2O$, 1:5 for 60 sec
  100C Hotplate Bake for 45 sec.

Figure 3A:
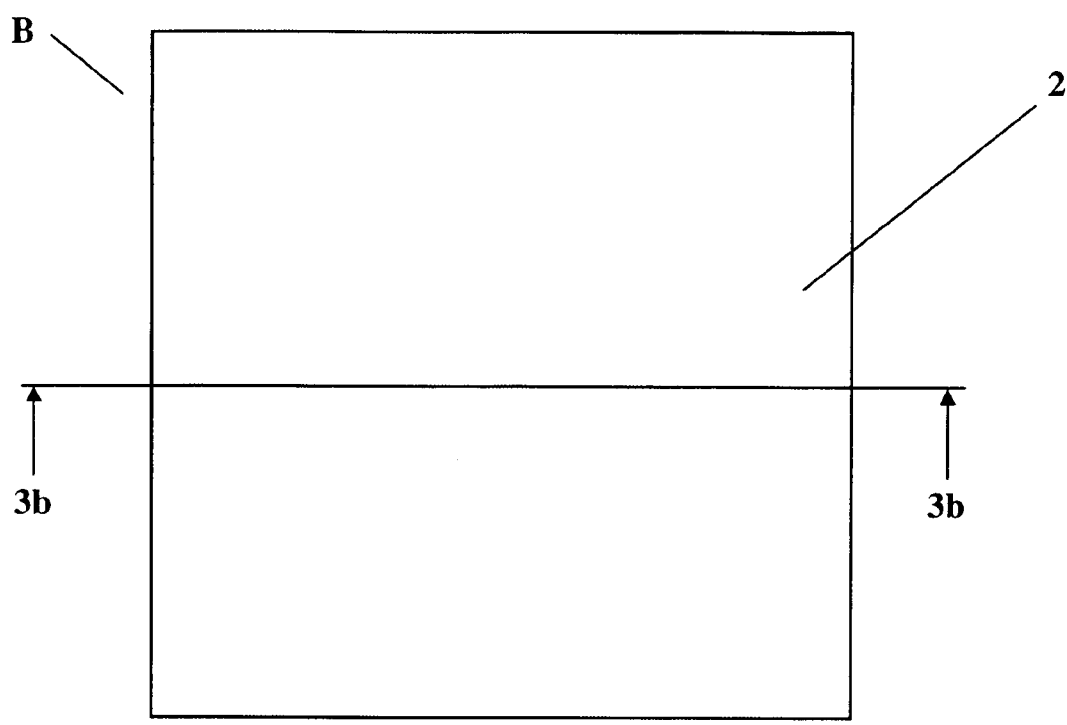
FIG. 3a is a top plan view of the preferred starting material of a resonator SOI wafer B and FIG. 3b is a cross-sectional view through wafer B of FIG. 3a at line 3b—3b of the bottom-portion wafer B.
Figure 3B:
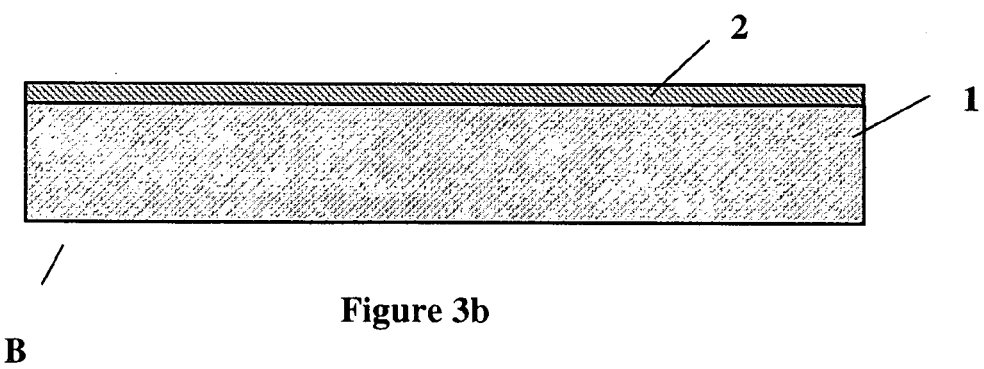

The bottom post wafer B is prepared next. On a bulk silicon base 1 having a preferable thickness a of $\leq 500$ µm, which is optionally lightly-doped bulk silicon layer (about 1e15 cm$^{-3}$) 2 a silicon dioxide layer, having a preferable thickness of $\leq 2$ µm, is formed preferably by thermal oxidation between 800° C. and 1000° C. as shown in FIGS. 3a and 3b.

Wafer B is bonded to resonator wafer A. The bondage between heavily-doped silicon epi-layer 3 of the bottom portion of wafer A and the silicon dioxide layer 2 of the wafer B is achieved by heating at a temperature from 800° C. to 1000° C., as shown in FIGS. 4a and 4b. In this process the $SiO_2$ layer 2 of wafer B is preferably bonded to the heavily doped silicon epi-layer, 3 of the SOI wafer A. The epi-layer 3 is preferably p-type, 1e19-1e20$^{-3}$.

Figure 5A:
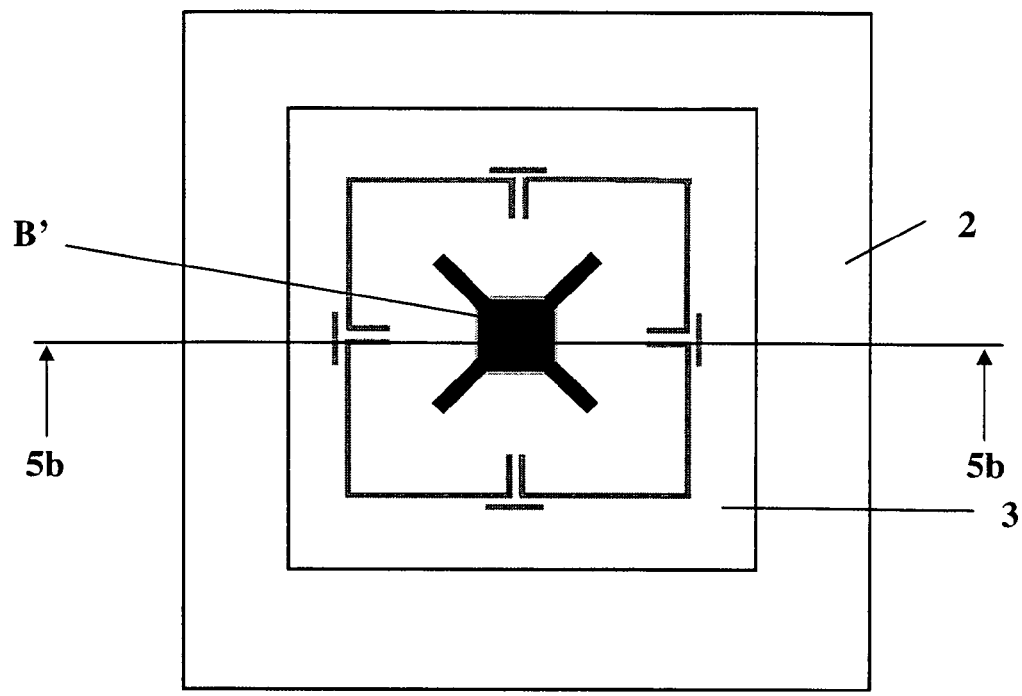
FIG. 5a is a top plan view of the resonator SOI wafer A and a bottom post B' and FIG. 5b is a cross-sectional view through wafer A and bottom post B' of FIG. 5a at line 5b—5b of the resonator SOI wafer A and bottom post B'.
Figure 5B:
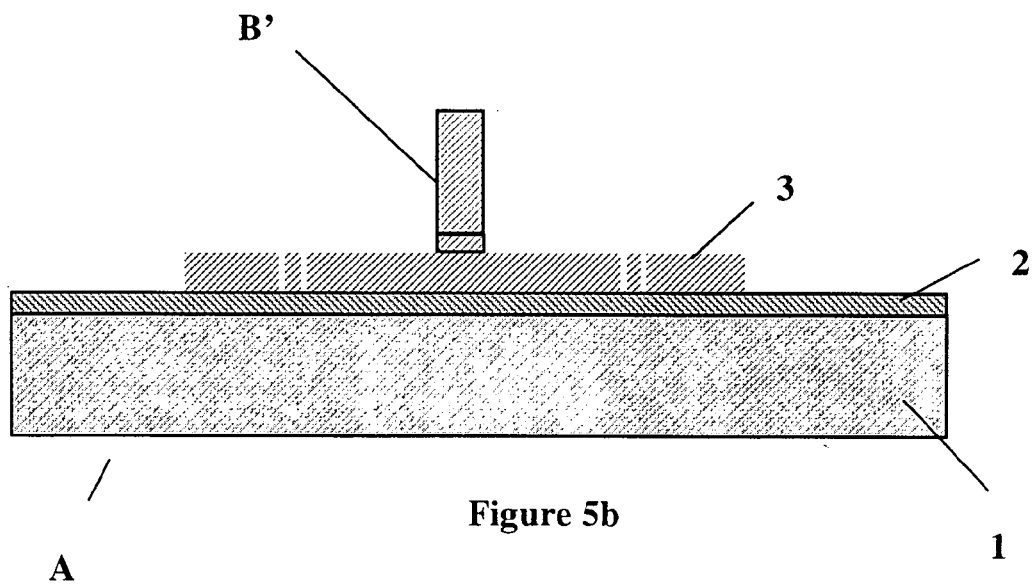

Then the bottom post B' and rib pattern are prepared. The bulk silicon layer 1 and silicon dioxide 2 of the wafer B have been partially removed to yield a post B' as shown in FIGS. 5a and 5b.

The process preferably comprises:
1. Coating the top silicon layer 1 of the wafer B with a layer of photoresist,
2. Projecting light from an illuminator through a mask that contains the pattern to be created on the wafer B,
3. Washing of the exposed regions of the photoresist layer and leaving an etch mask on the silicon surface of the wafer B.
4. Etching silicon layer 1 unprotected by photoresist by gases utilizing the deep reactive ion etch (DRIE).

5. Removing SiO$_2$ layer 2 of wafer B by CF$_4$/O$_2$ plasma etch, and
6. Removing of photoresist on the surface of the post B'.

Figure 6A:
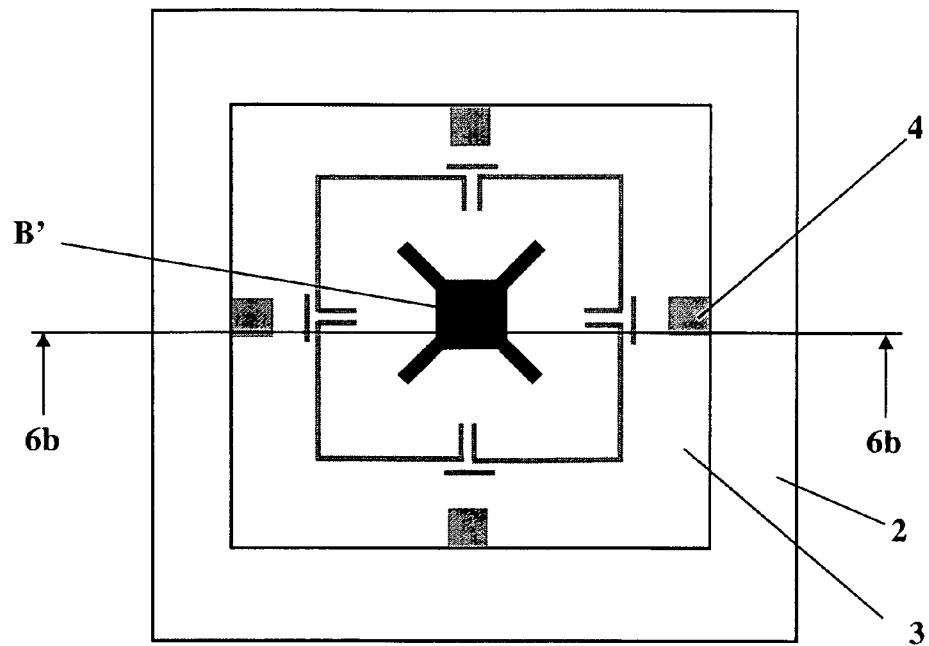
FIG. 6a is a top plan view of the resonator SOI wafer A and a bottom post B' and FIG. 6b is a cross-sectional view through wafer A and bottom post B' of FIG. 6a at line 6b—6b of the resonator SOI wafer A and bottom post B' after several contacts are attached to it.
Figure 6B:
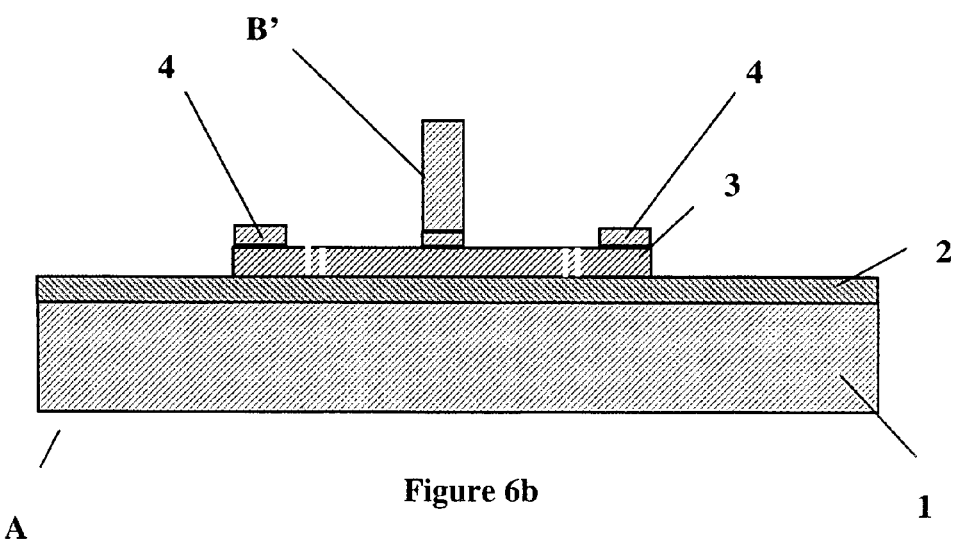

Then ohmic contacts are formed. On the heavily doped silicon epi-layer 3 several contacts 4, are preferably formed by sputtering metal. The contacts 4 are placed symmetrically around the post B'. The contacts 4 contain preferably Ti/Pd/Au, Ti/Pt/Au or mixtures thereof. The contacts 4 are prepared by photo resist lithography, wet etching the metal and removing the photo resist (photoresist spray lithography, metallization Ti/Pt/Au and metal lift-off), as shown in FIGS. 6a and 6b. Metal liftoff is a common means of creating narrow metal lines for metals. The metal liftoff process is preferably done in a spray system. The process of resist photoresist, spray lithography, metallization and metal lift-off is described for example, in inter alia, in Andrea Via et al. "Metal Lift-off on InP HBTs Using Carbon Dioxide Snow Spray" (see: www1.boc.com/eco-snow/pdf/CS-MAX%202002.pdf.)

The process preferably comprises:
1. Coating the heavily doped silicon epi-layer, p-type, 1e19-1e20 cm$^{-3}$ 3 of the wafer A by metallization with sputter metal (Ti/Pd/Au).
2. Coating metal (Ti/Pd/Au) on the layer 3 with a layer of photoresist,
3. Projecting light from an illuminator through a mask that contains the pattern, namely the places for the ohmic contacts 4 to be created, on the layer 3 of wafer A,
4. Washing of the exposed regions of the photoresist layer and leaving an etch mask on the silicon surface of the wafer A, Removing the metal which is not covered by photoresist by wet etch,
5. Removing of photoresist on the surface of the ohmic contacts 4.

The process for photoresist spray lithography, metallization Ti/Pt/Au and metal lift-off preferably comprises:
1. Coating layer 3 with a layer of photoresist,
2. Projecting light from an illuminator through a mask that contains the pattern, namely the places for the ohmic contacts Ti/Pt/Au 4 to be created, on the layer on the layer 3 of wafer A,
3. Washing of the exposed regions of the photoresist layer and leaving an etch mask on the silicon surface of the wafer A, Removing the metal which is not covered by photoresist by wet etch,
4. Depositing Ti/Pt/Au 4 by spray lithography,
5. Removing of Ti/Pt/Au 4 covering the photoresist by a metal lift-off process,
6. Stripping of the remaining photoresist yielding an Ti/Pt/Au 4 pattern on the to surface of wafer C.

Figure 7A:
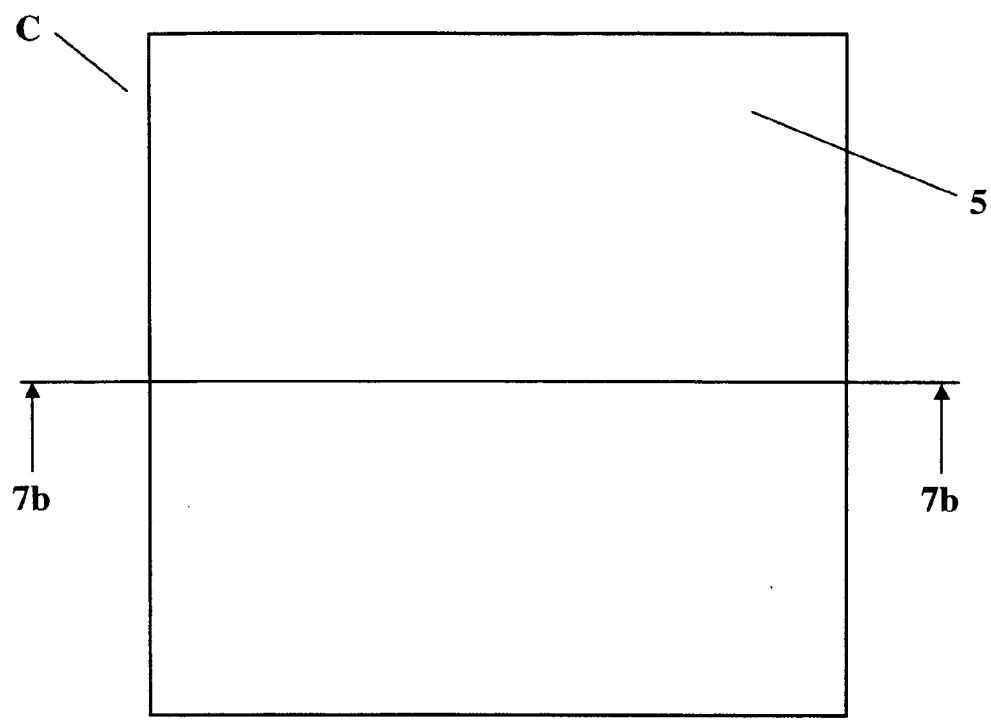
FIG. 7a is a top plan view of the preferred starting material of a base wafer C and FIG. 7b is a cross-sectional view through wafer C of FIG. 7a at line 7b—7b of the base wafer C.
Figure 7B:
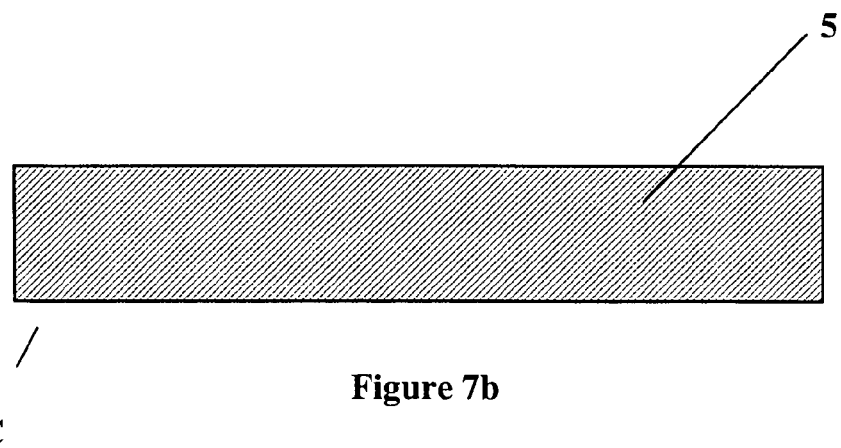

Then a base wafer C is prepared. The preferred starting material 5 of the base wafer C has a preferable thickness of about ≦800 μm and contains moderately doped silicon substrate p-type, 1e19 cm$^{-3}$, as shown in FIGS. 7a and 7b.

Figure 8A:
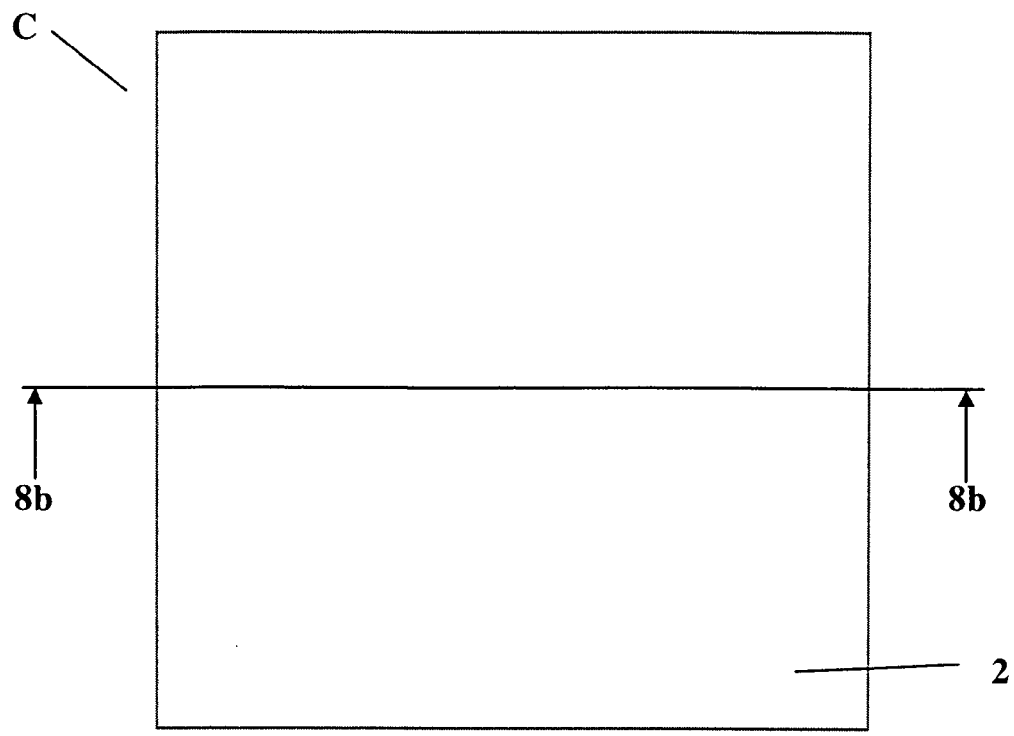
FIG. 8a is a top plan view of the preferred starting material of the base wafer C and FIG. 8b is a cross-sectional view through wafer C FIG. 8a at line 8b—8b of the base wafer C, after on both surfaces of base wafer C an silicon dioxide layer is grown.
Figure 8B:
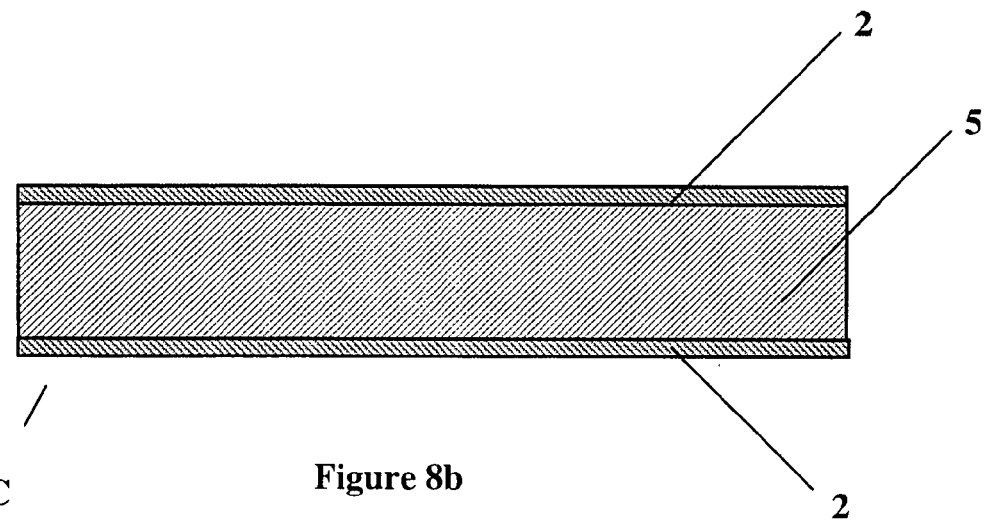

On both surfaces of the preferred starting material 5 of the base wafer C a silicon dioxide layer 2 of ≦0.3 μm-thick is grown by thermal oxidation at a temperature preferably of about 950° C., as shown in FIGS. 8a and 8b.

Figure 9A:
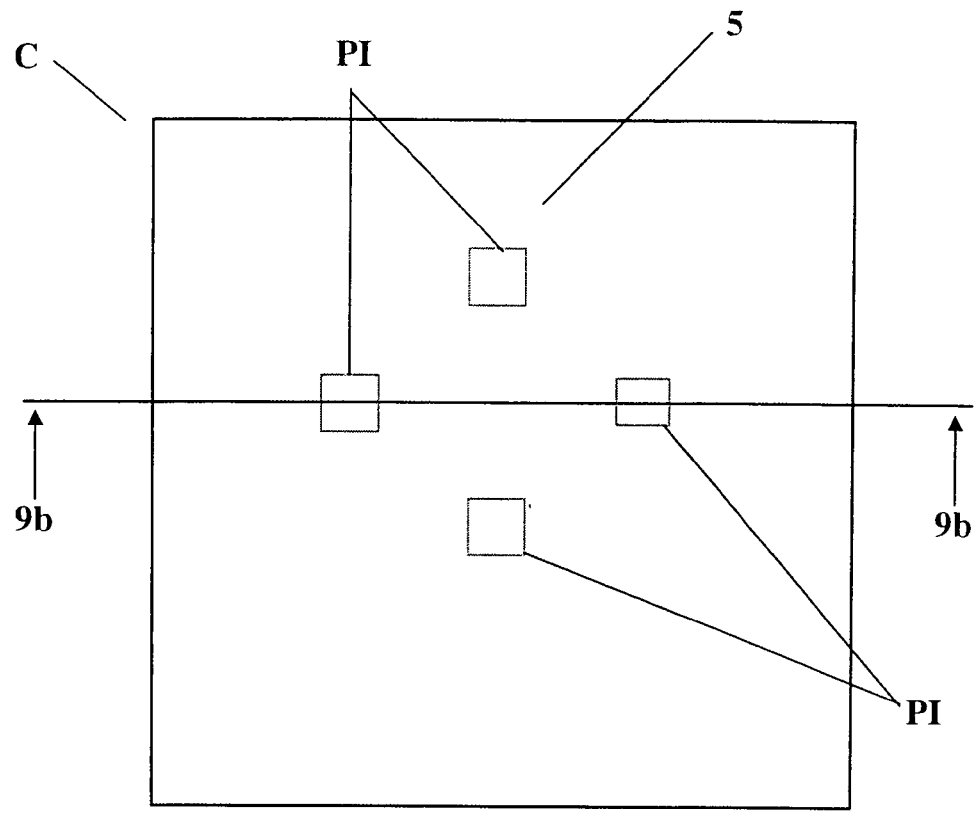
FIG. 9a is a top plan view of the preferred starting material of the base wafer C and FIG. 9b is a cross-sectional view through wafer C of FIG. 9a at line 9b—9b of the base wafer C, after pillar fabrication.
Figure 9B:
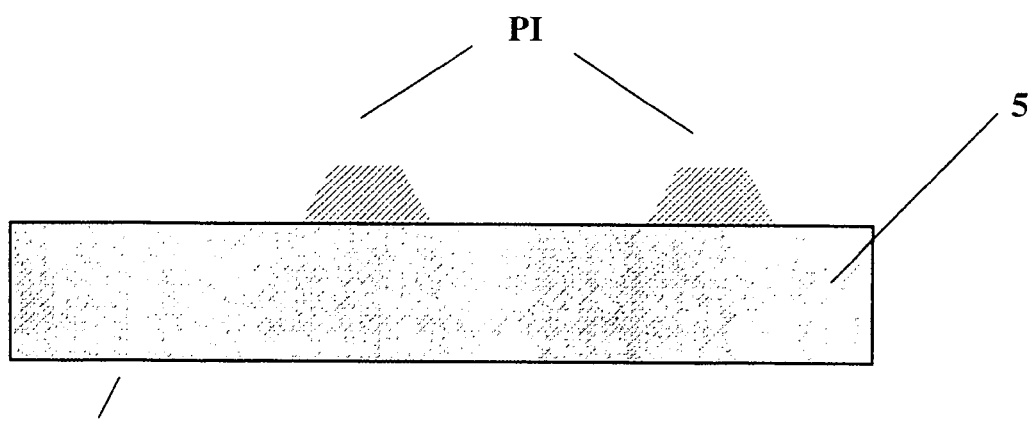

Then a pillar fabrication is carried out. From the preferred starting material 5 a thickness of preferably about 5 μm to 8 μm is removed by photo resist lithography, wet etch SiO$_2$ and photo resist removal, wet KOH etch of silicon and SiO$_2$ removal in order to obtain pillars PI, as shown in FIGS. 9a and 9b.

The process preferably comprises:
1. Coating the top and bottom SiO$_2$ layer 2 of wafer C with a layer of photoresist,
2. Projecting light from an illuminator through a mask that contains the pattern, namely the places for the pillars PI to be created, on the top layer 2 of wafer C,
3. Washing of the exposed regions of the photoresist layer and leaving an etch mask on the SiO$_2$ layer 2 of the wafer C,
4. Removing the SiO$_2$ layer 2, which is not covered by photoresist, by CF$_4$/O$_2$ plasma etch,
5. Removing 5–8 μm of moderate doped Si preferred starting material 5 by wet KOH etch to produce a cavity CA,
6. Removing of remaining photoresist, and
7. Removing SiO$_2$ layer 2 on the pillars and on the bottom layer by CF$_4$/O$_2$ plasma etch.

Figure 10A:
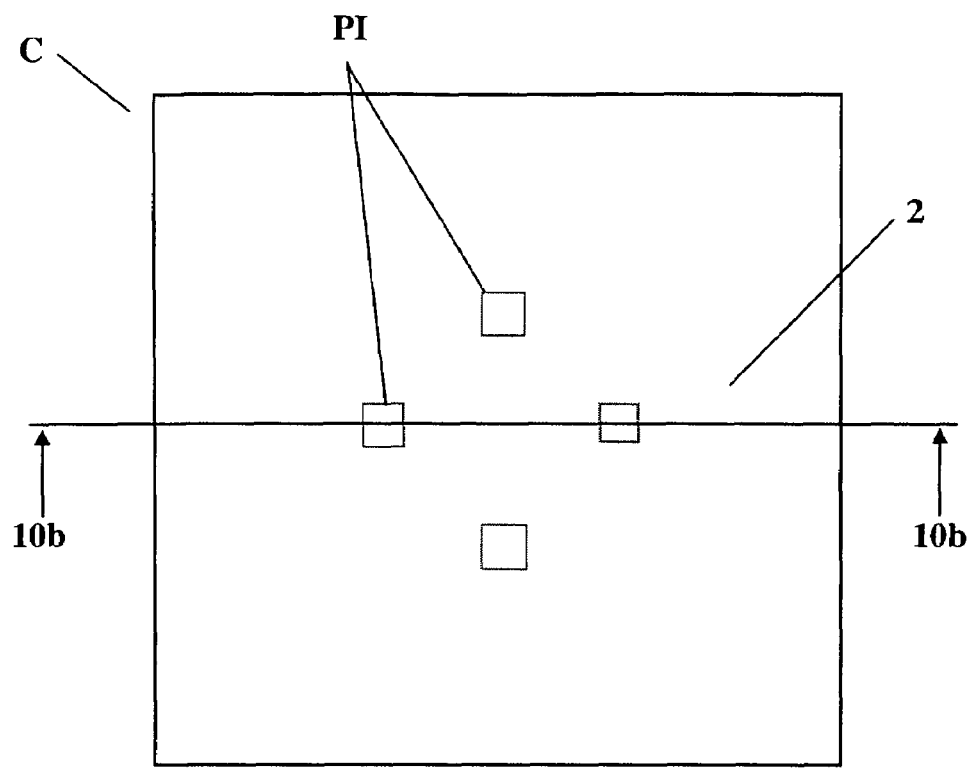
FIG. 10a is a top plan view of the preferred starting material of the base wafer C and FIG. 10b is a cross-sectional view through wafer C of FIG. 10a at line 10b—10b of the base wafer C, after on both surfaces of base wafer C an silicon dioxide layer is grown.
Figure 10B:
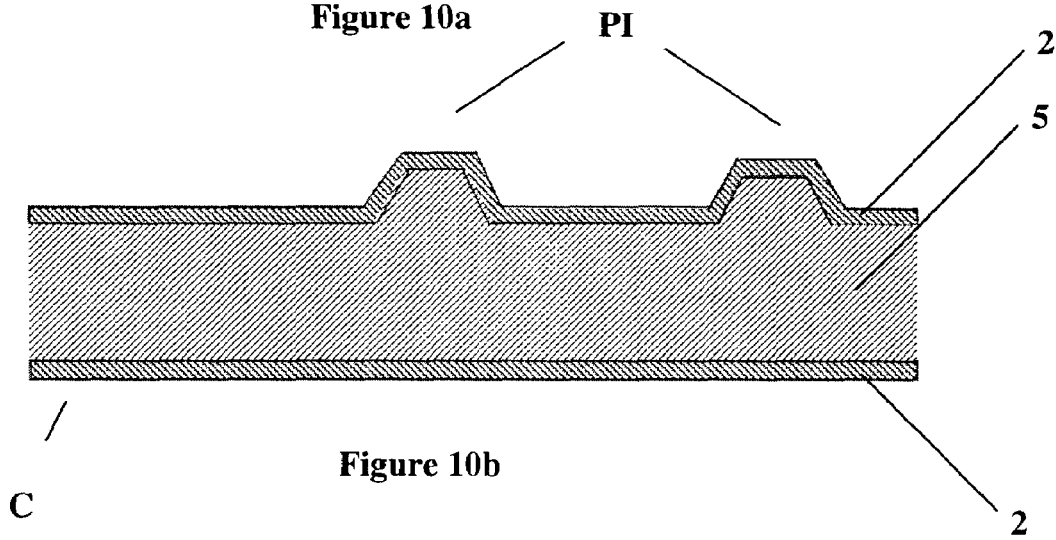

On both surfaces of the preferred starting material 5 of the base wafer C an SiO$_2$ layer of ≦2 μm thick is grown by thermal oxidation at a preferable temperature of about 1050° C., as shown in FIGS. 10a and 10b.

Figure 11A:
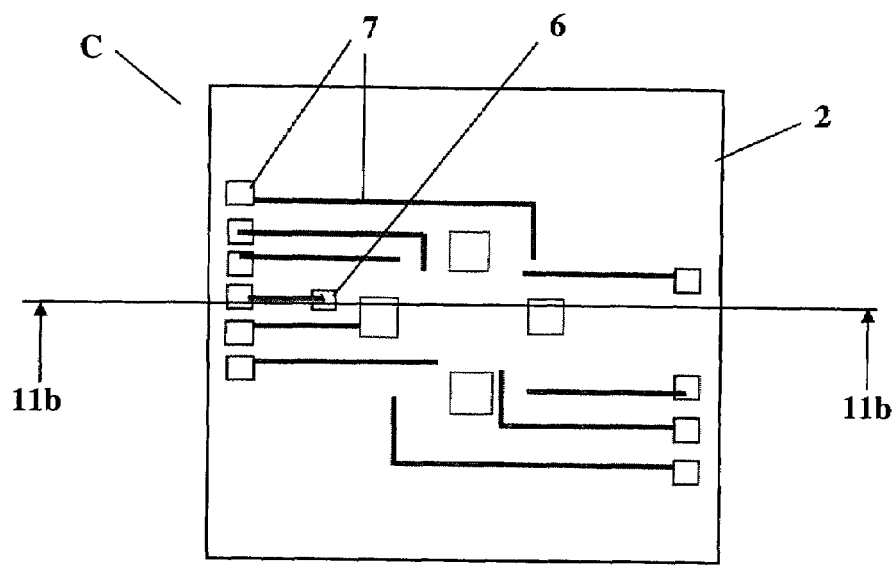
FIG. 11a is a top plan view of the preferred starting material of the base wafer C and FIG. 11b is a cross-sectional view through wafer C of FIG. 11a at line 11b—11b of the base wafer C after an ohmic contact and interconnect metal patterning.
Figure 11B:
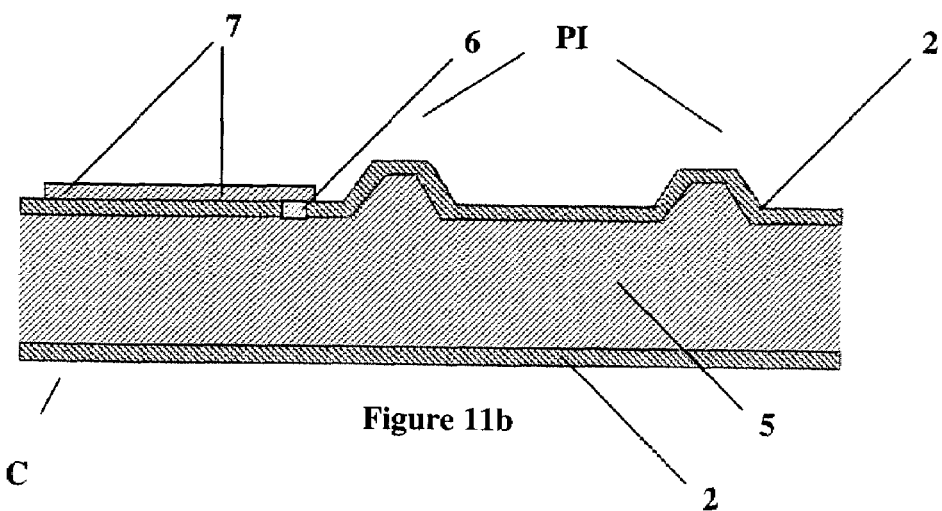

An ohmic contact metal Al 6 and interconnect metal Ti/Al 7 were attached to the preferred starting material 5 of the base wafer C by photo resist spray lithography and metal deposition and liftoff, as shown in FIGS. 11a and 11b.

The process preferably comprises:
1. Coating SiO$_2$ layer 2 with a layer of photoresist,
2. Projecting light from an illuminator through a mask that contains the pattern namely the places for the ohmic contact Al 6 to be created on the layer 2 of wafer C,
3. Washing of the exposed regions of the photoresist layer and leaving an etch mask on the SiO$_2$ layer 2 of the wafer C,
4. Removing the SiO$_2$ layer 2 by wet etch which is not covered by photoresist,
5. Depositing Al 6 by spray lithography,
6. Removing of Al 6 covering the photoresist by a metal lift-off process,
7. Stripping of the remaining photoresist yielding an Al 6 pattern on the to surface of wafer C,
8. Coating the top layer 2 of wafer C again with a layer of photoresist,
9. Projecting light from an illuminator through a mask that contains the pattern, namely the places for the interconnect metal Ti/Al 7 to be created, on the SiO$_2$ layer 2 of wafer C,
10. Depositing Ti/Al 7 by spray lithography,
11. Removing of Ti/Al 7 covering the photoresist by a metal lift-off process,
12. Stripping of remaining photoresist and yielding a Ti/Al 7 pattern on the wafer C.

Figure 12A:
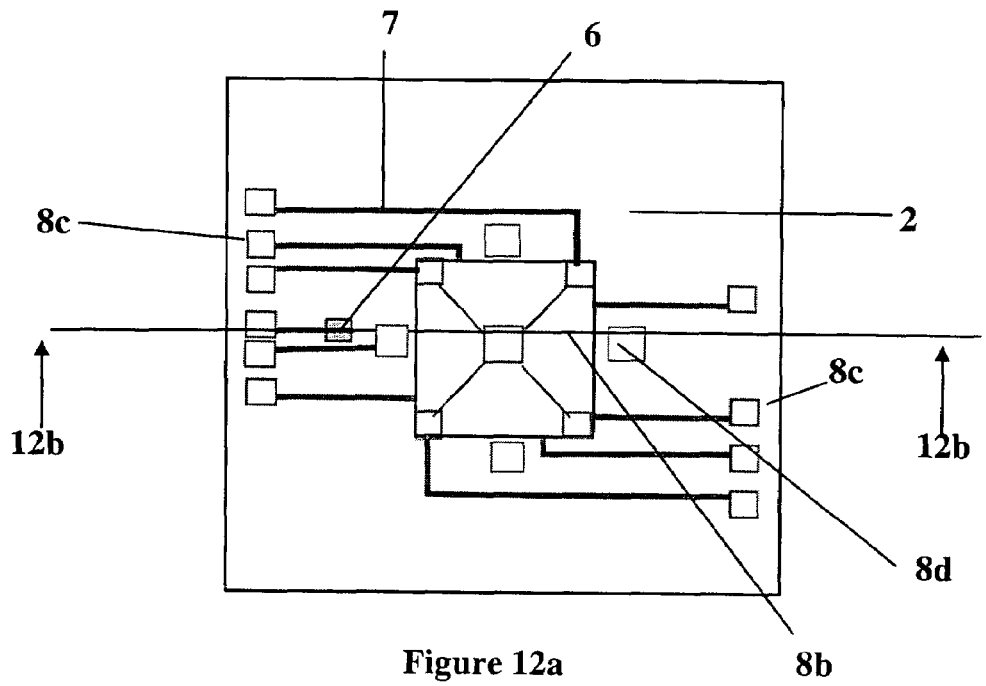
FIG. 12a is a top plan view of the preferred starting material of the base wafer C and FIG. 12b is a cross-sectional view through wafer C of FIG. 12a at line 12b—12b of the base wafer C after electrode, bond pad, and wire bond metal were provided on the base wafer C.
Figure 12B:
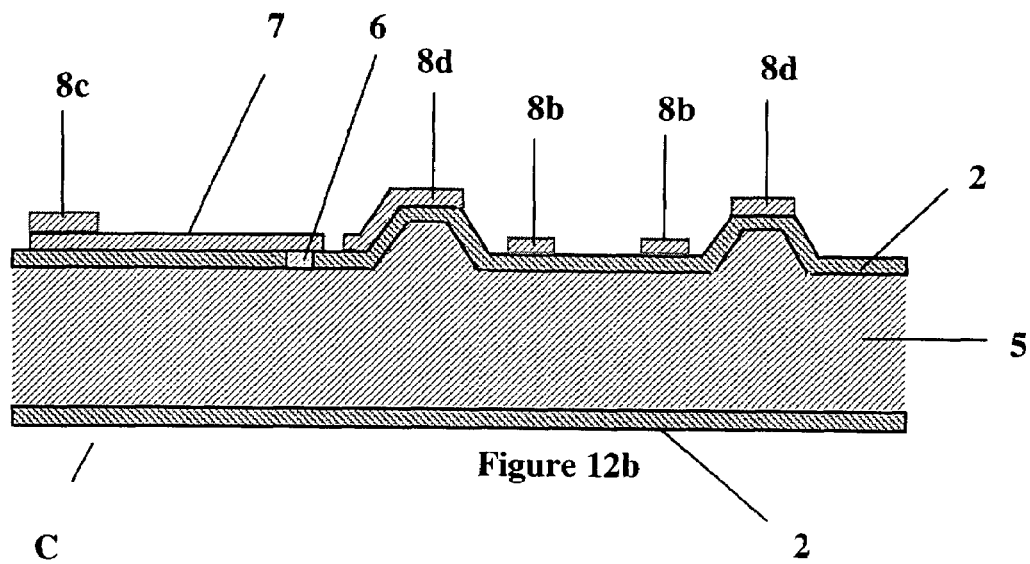

Electrode metal (drive/sense electrodes) Ti/Pt/Au 8b, wire bond metal Ti/Pt/Au 8c, and wafer bonding metal Ti/Pt/Au 8d were provided by photoresist lithography and metal deposition and liftoff, as shown in FIGS. 12a and 12b.

The process preferably comprises:
1. Coating the top surface of wafer C with a layer of photoresist,
2. Projecting light from an illuminator through a mask that contains the pattern, namely the places for the wire bond metal Ti/Pt/Au 8 to be created, on the top surface of wafer C,
3. Washing of the exposed regions of the photoresist layer and leaving an mask on the top surface of the wafer C,
4. Depositing Ti/PT/Au 8 on the surface of wafer C spray lithography,
5. Removing of excess Ti/PT/Au 8 covering the photoresist by a metal lift-off process,
6. Stripping of remaining photoresist yielding a wire bond Ti/PT/Au 8.

Figure 13A:
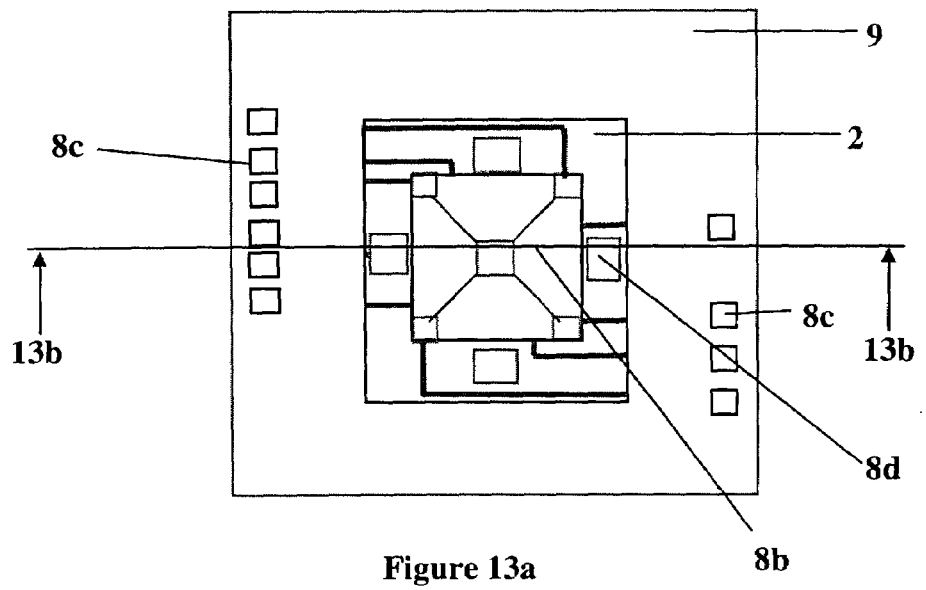
FIG. 13a is a top plan view of the preferred starting material of the base wafer C and FIG. 13b is a cross-sectional view through wafer C of FIG. 13a at line 13b—13b of the base wafer C after silicon nitride is provided on the base wafer C.
Figure 13B:
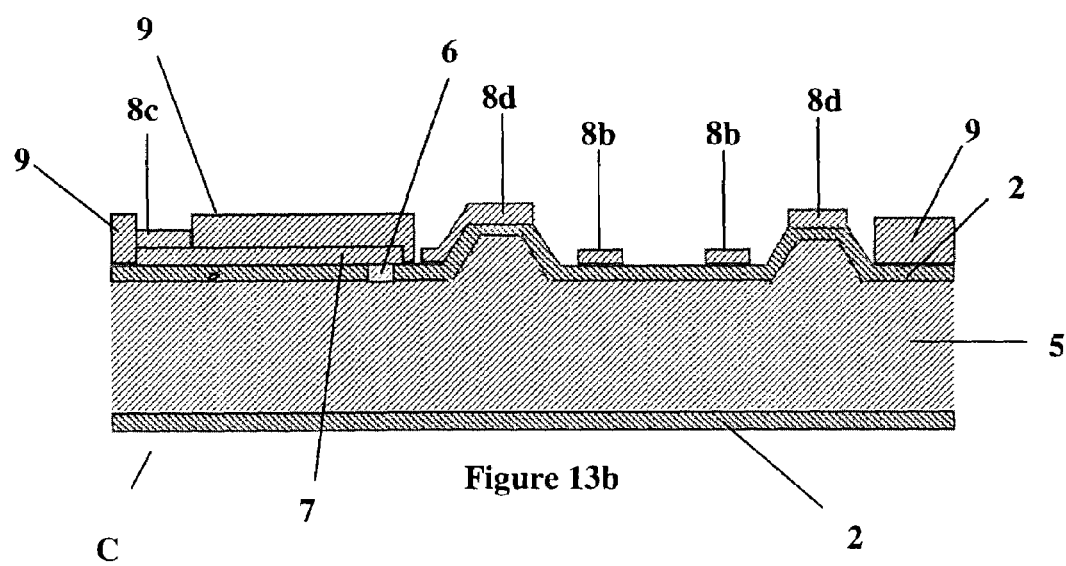

Silicon nitride 9 layer is provided on the top of base wafer C by the dielectric layer deposition and patterning. A $Si_3N_4$ film $\leq 0.5$ μm thick is provided by deposition and photo resist lithography and removed by $CF_4/O_2$ plasma etch of $Si_3N_4$ in device and wire bond regions and by photo resist removal, as shown in FIGS. 13*a* and 13*b*.

The process preferably comprises:
1. Coating the surface of wafer C with $Si_3N_4$ 9, with a thickness of about 0.5 μm,
2. Coating $Si_3N_4$ 9 with a layer of photoresist,
3. Projecting light from an illuminator through a mask that contains the pattern, namely covering the places for the interconnect metal dielectric layer $Si_3N_4$ 9 to be created, on the surface of wafer C,
4. Washing of the exposed regions of the photoresist layer and leaving an mask on $Si_3N_4$ 9,
5. Removing the $Si_3N_4$ 9 which is not covered by $CF_4/O_2$ plasma etch, and
6. Stripping of remaining photoresist.

Figure 14A:
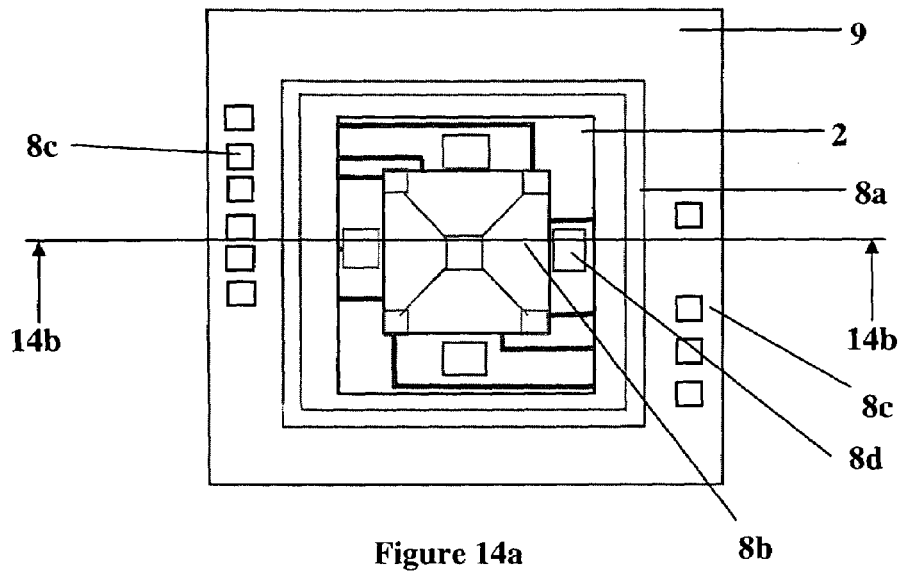
FIG. 14a is a top plan view of the preferred starting material of the base wafer C and FIG. 14b is a cross-sectional view of through wafer C of FIG. 14a at line 14b—14b of the base wafer C after a seal ring deposition.
Figure 14B:
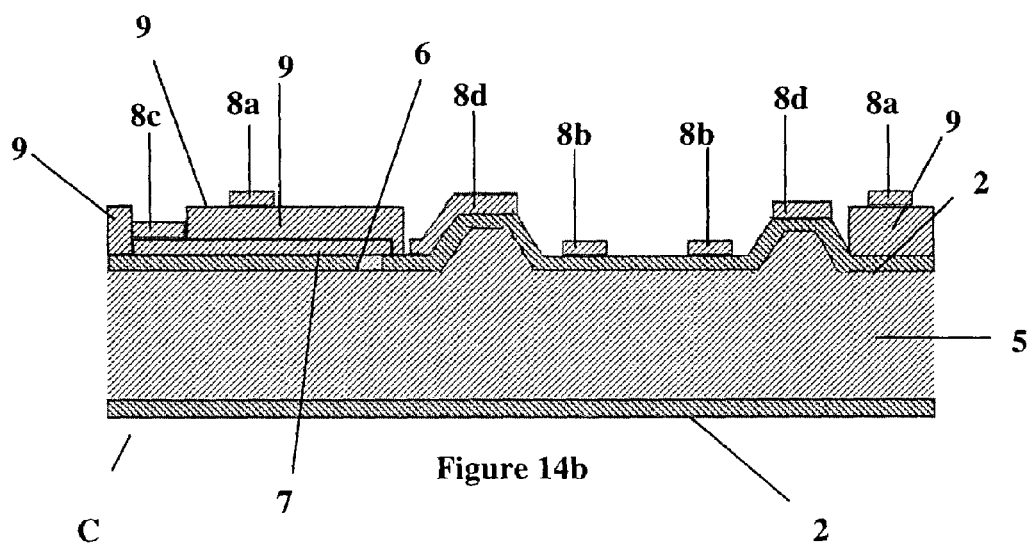

A seal ring 8*a* containing Ti/Pt/Au is provided on the silicon nitride 9 by metal patterning and deposition, particularly by photo resist lithography spray on thick resist and metal deposition and liftoff, as shown in FIGS. 14*a* and 14*b*.

The process preferably comprises:
1. Coating the top surface of wafer C with a layer of photoresist,
2. Projecting light from an illuminator through a mask that contains the pattern, namely the places for seal ring metal 8*a* containing Ti/Pt/Au provided on the silicon nitride 9 to be created, on the top surface of wafer C,
3. Washing of the exposed regions of the photoresist layer and leaving an mask on the top surface of the wafer C,
4. Depositing Ti/PT/Au on the surface of wafer C,
5. Removing of excess Ti/PT/Au 8*a* covering the photoresist by a metal lift-off process,
6. Stripping of remaining photoresist yielding removing of excess Ti/PT/Au 8*a* covering the photoresist by a metal lift-off process,
7. Stripping of remaining photoresist yielding a seal ring 8*a* containing Ti/Pt/Au on the silicon nitride 9.

As a next step a post hole etch 5' is carried out by photo resist lithography (spray on thick resist), $CF_4/O_2$ plasma etch of silicon dioxide in hole region, DRIE of silicon hole and photo resist removal as shown in FIGS. 15*a* and 15*b*.

The process preferably comprises:
1. Coating the top surface of wafer C with a layer of photoresist,
2. Projecting light from an illuminator through a mask that contains the pattern namely the place for the hole region on the top surface of wafer C,
3. Washing of the exposed regions of the photoresist layer and leaving an mask on the top surface of the wafer C,
4. $CF_4/O_2$ plasma etch of silicon dioxide in hole region,
5. DRIE remove to create a silicon hole, and
6. Stripping of the remaining photo resist layer.

Figure 16B:
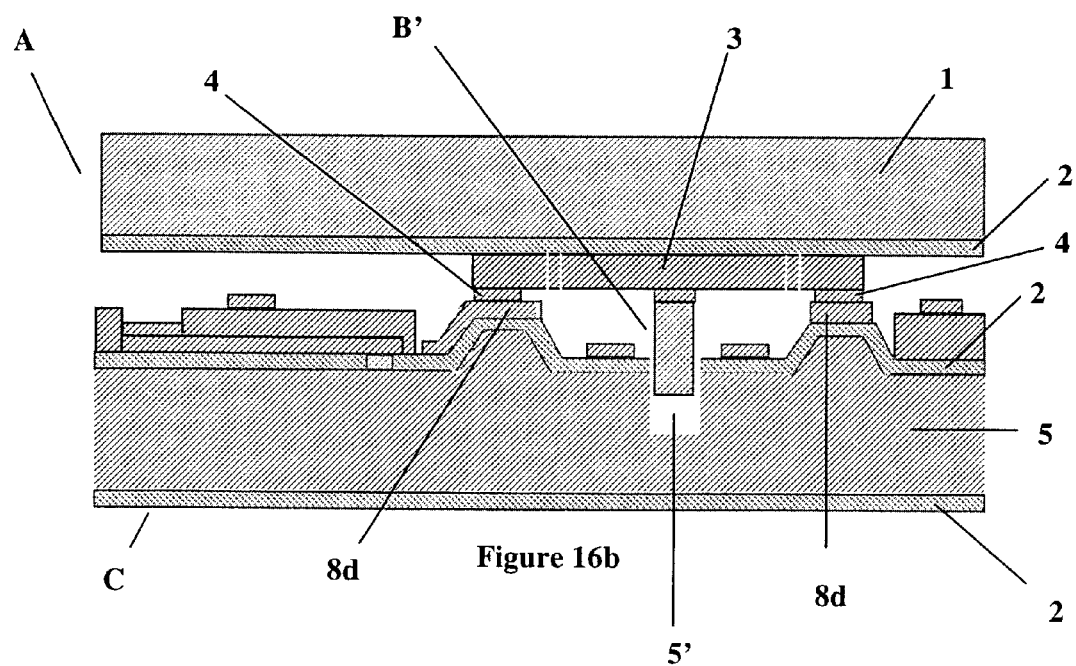

As a next step a bonding of resonator wafer A according to FIG. 6*b* and to base wafer C according to FIG. 15*b* is carried out preferably by a Au to Au thermo compression bonding at temperature of 300° C. to 400° C., as shown in FIGS. 16*a* and 16*b*. The bonding is carried between the contacts 4 of resonator wafer A–B and the seal ring metal 8*a* of the base wafer C. Post B' of resonator wafer A–B fits into the post hole 5' of base wafer C.

Figure 17A:
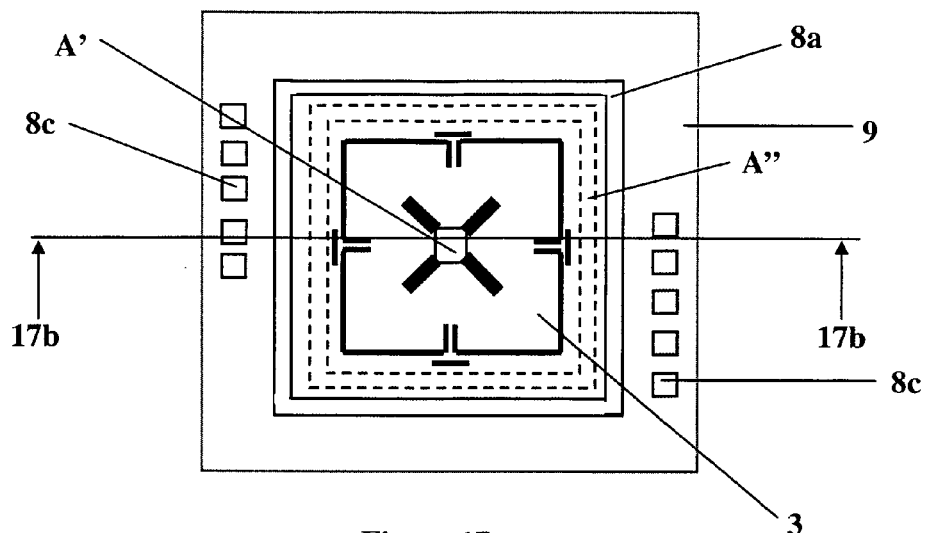
FIG. 17a is a top plan view depicting post A' and base wafer C and FIG. 17b is a cross-sectional view through the base wafer A, post B', and base wafer C of FIG. 17a at line 17b-17 depicting post A', post B', and base wafer C after post formation.
Figure 17B:
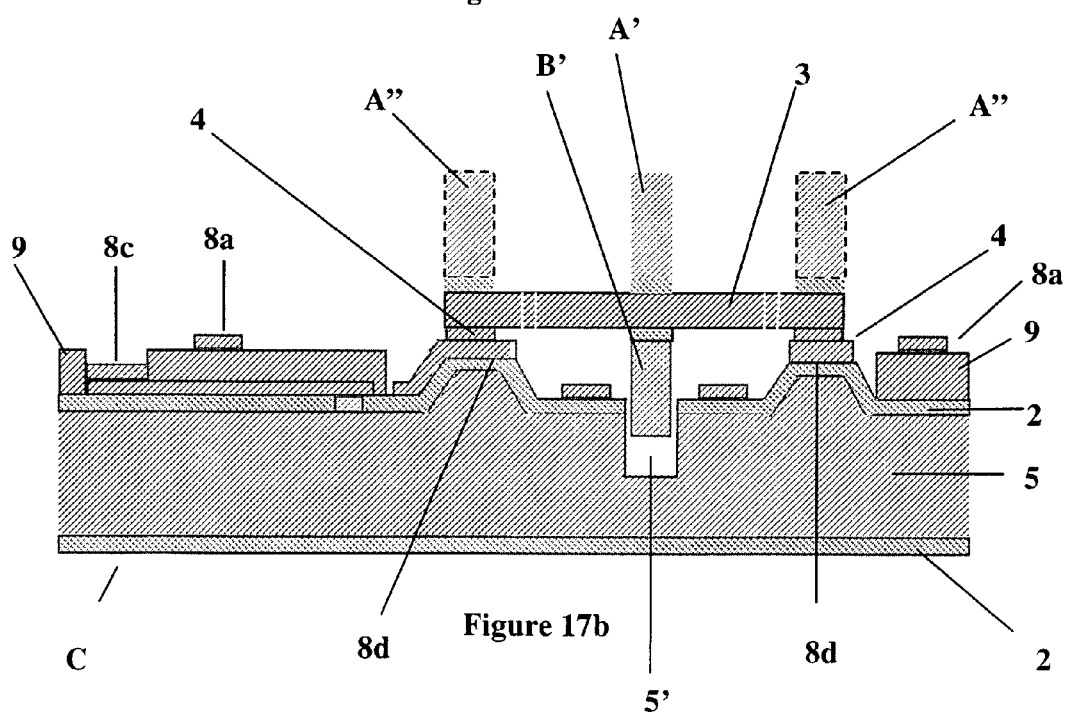

The post fabrication on wafer A is carried out by photo resist lithography (spray on thick resist), $CF_4/O_2$ plasma etching of silicon dioxide, photo resist removal by dry etch. Thereby a post A' and optional frame formation in the top layer A" is obtained, as shown in FIGS. 17*a* and 17*b*.

The process preferably comprises:
1. Coating the top surface of wafer A with a layer of photoresist,
2. Projecting light from an illuminator through a mask that contains the pattern, namely the place for the hole region on the top surface of wafer A,
3. Washing of the exposed regions of the photoresist layer and leaving an mask on the top surface of the wafer A,
4. DRIE remove of silicon from wafer A,
5. $CF_4/O_2$ plasma etch of silicon dioxide from wafer A, whereby a post A' and optional frame formation in the top layer A" is obtained, and
6. Stripping of the remaining photo resist layer.

Figure 18A:
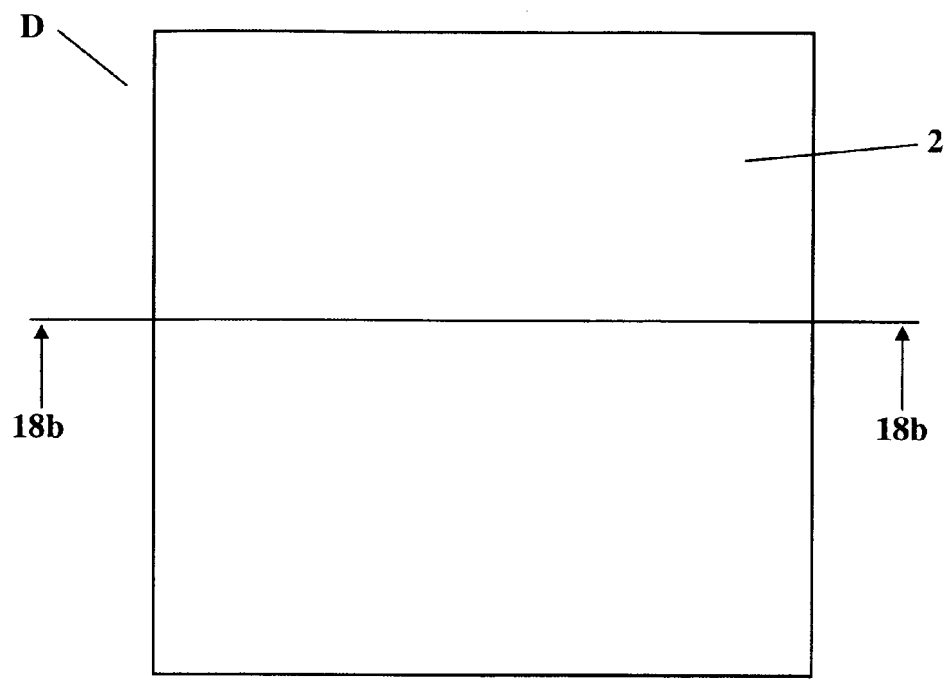
FIG. 18a is a top plan view of the preferred starting material of a cap wafer D and FIG. 18b is a cross-sectional view through the cap wafer D of FIG. 18a at line 18b—18b of the cap wafer D.
Figure 18B:
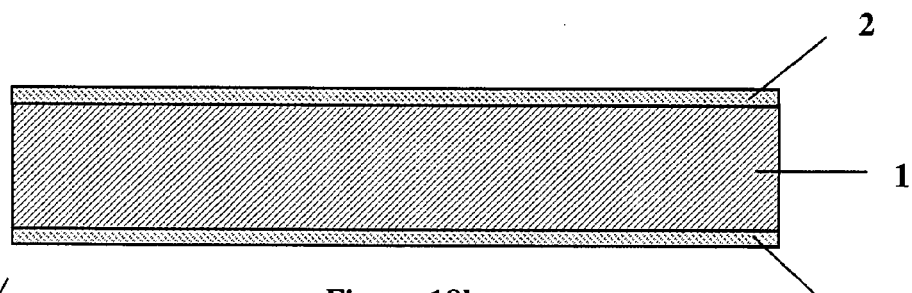

A cap wafer D is prepared with a preferred starting material of lightly doped bulk silicon 1 having a thickness of $\leq 800$ μm and having on top and bottom a thin silicon dioxide layer 2, as shown in FIGS. 18*a* and 18*b*.

Figure 19A:
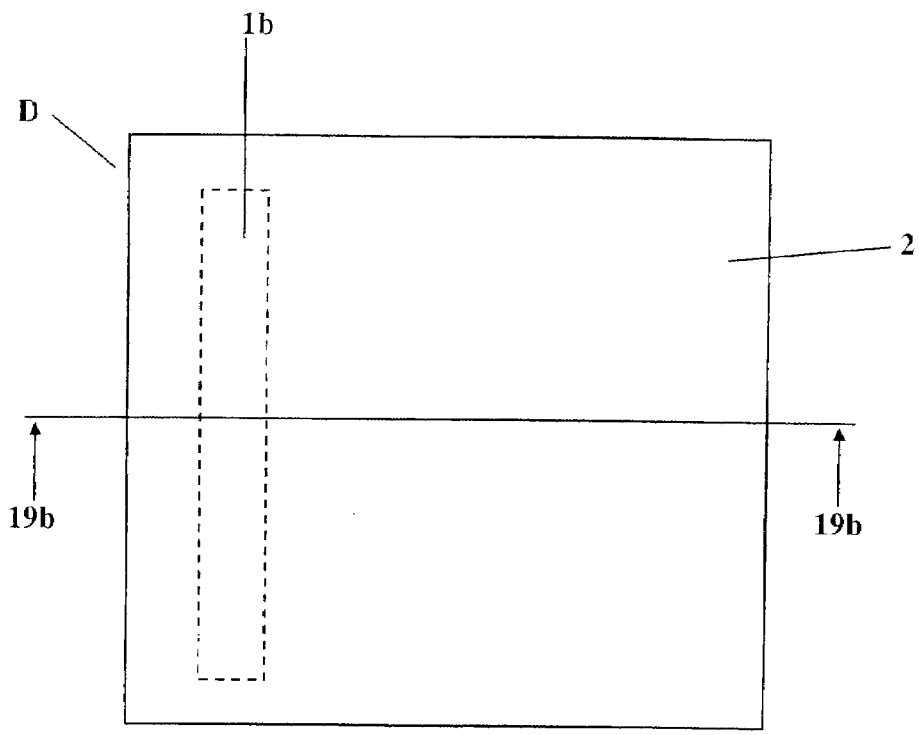
FIG. 19a is a top plan view of the preferred starting material of a cap wafer D and FIG. 19b is a cross-sectional view through the cap wafer D of FIG. 19a at line 19b—19b of the cap wafer D after preparing of holes in the top layer.
Figure 19B:
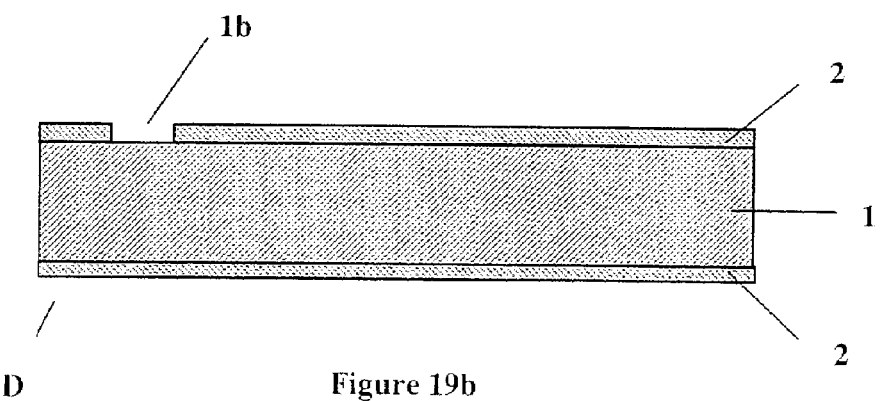

An opening 1*b* into the top silicon dioxide layer 2 to form silicon dioxide holes for front side silicon etching of wire bonding pad 8*c* is carried out by photo resist lithography, dry etch of silicon dioxide and photo resist removal, as shown in FIGS. 19*a* and 19*b*.

The process preferably comprises:
1. Coating the top surface $SiO_2$ of the cap wafer D with a layer of photoresist,
2. Projecting light from an illuminator through a mask that contains the pattern, namely the place for the hole region on the top surface of cap wafer E,
3. Washing of the exposed regions of the photoresist layer and leaving an mask on the top surface of the wafer E,
4. $CF_4/O_2$ plasma etch of silicon dioxide until the Silicon starts yielding a hole 1*b* into the top silicon dioxide layer 2,
5. Stripping of the remaining photo resist layer.

Figure 20A:
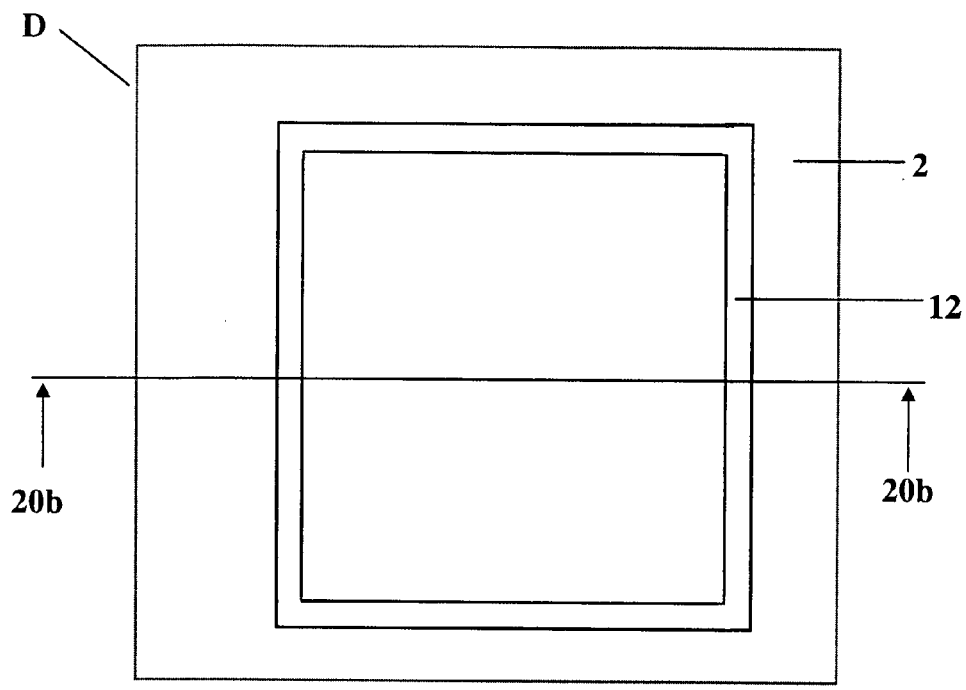
FIG. 20a is a bottom plan view of the preferred starting material of the cap wafer D and FIG. 20b is a cross-sectional view through the cap wafer D of FIG. 20a at line 20b—20b of the cap wafer D after backside metallization.
Figure 20B:
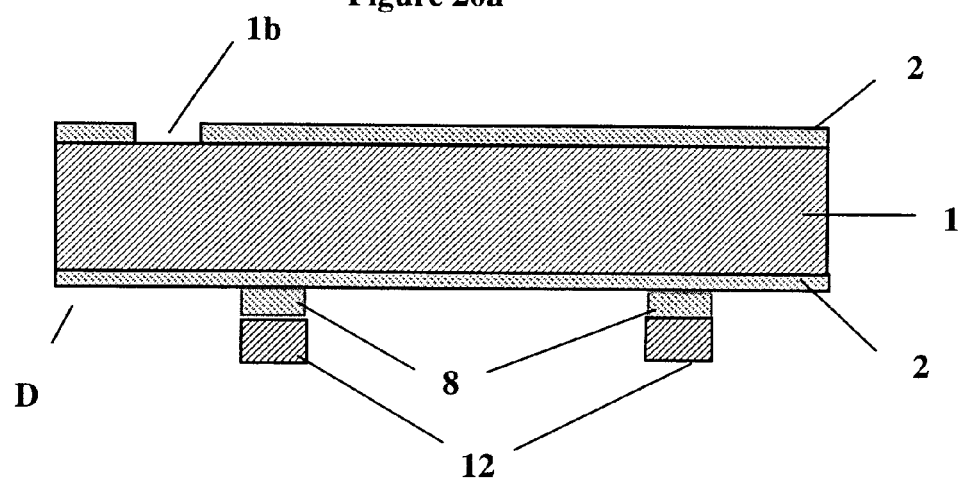

Then a backside metallization is carried out by photo resist lithography and metal deposition and liftoff. Thereby Ti/Pt/Au 8 and solder metal 12 are attached, as shown in FIGS. 20*a* and 20*b*.

The process preferably comprises:
1. Coating the bottom surface of cap wafer D with a layer of photoresist,
2. Projecting light from an illuminator through a mask that contains the pattern, namely the places for seal ring Ti/Pt/Au 8 and solder metal 12 to be attached, on the bottom surface of wafer cap wafer E,
3. Washing of the exposed regions of the photoresist layer and leaving an mask on the top surface of the wafer E,
4. Depositing Ti/PT/Au on the bottom surface of cap wafer E,
5. Depositing solder metal 12 on the bottom surface of cap wafer E,
6. Removing of excess Ti/PT/Au 8 and solder metal 12 covering the photoresist by a metal lift-off process,
7. Stripping of remaining photoresist yielding a seal ring Ti/PT/Au 8 and solder metal 12.

Figure 21A:
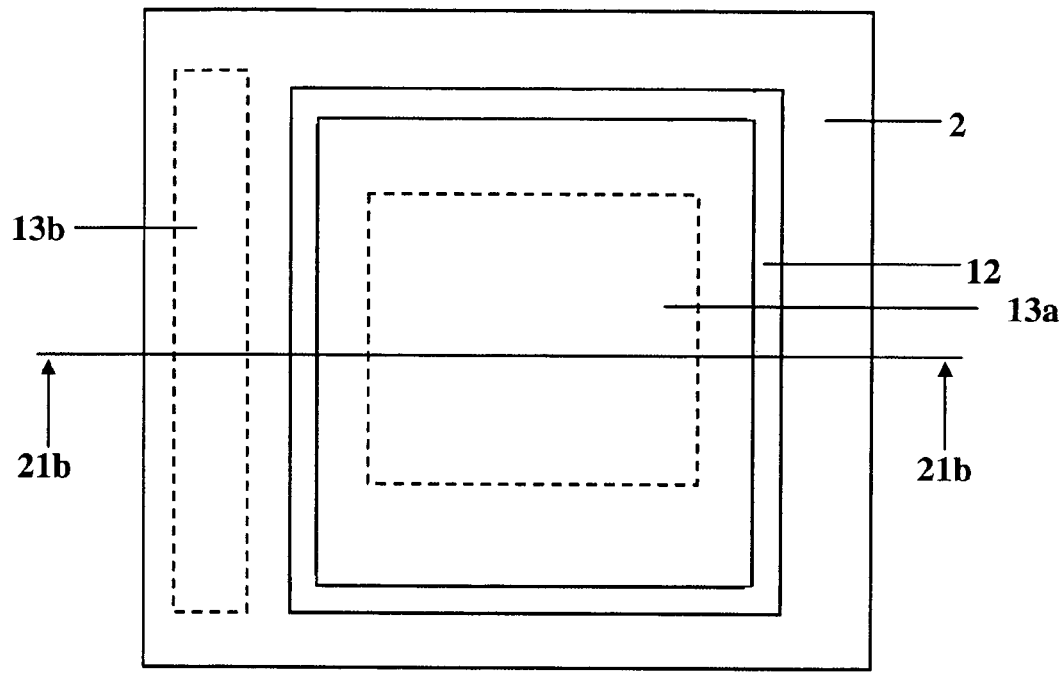
FIG. 21a is a bottom plan view of the preferred starting material of the cap wafer D and FIG. 21b is a cross-sectional view through the cap wafer D of FIG. 21a at line 21—21 of the cap wafer D after formation of backside cavities.
Figure 21B:
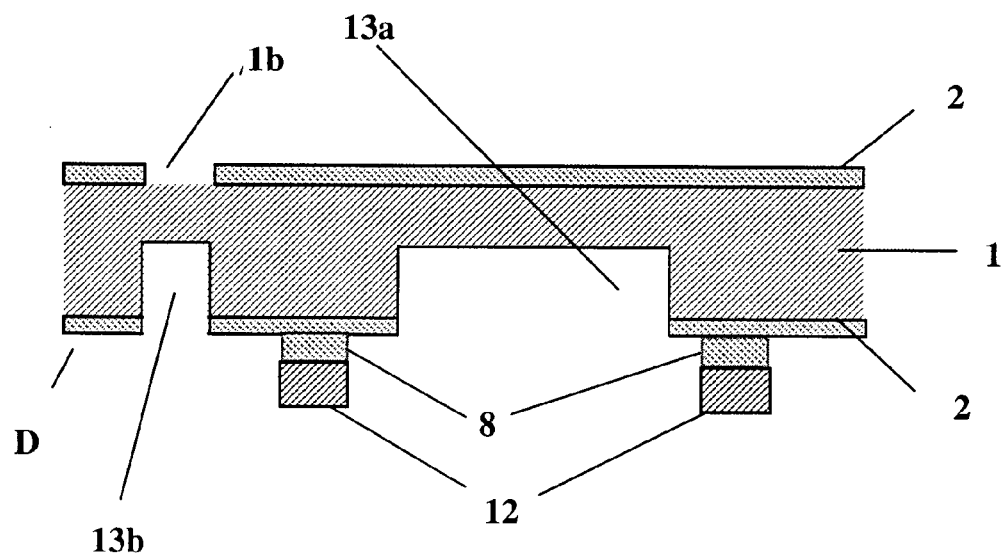

Then backside cavities 13*a* and 13*b* are formed on the cap wafer D by spray thick photo resist on the backside, DRIE etch $SiO_2$, DRIE cavities and remove photo resist, as shown in FIGS. 21*a* and 21*b*.

The process preferably comprises:
1. Coating the bottom silicon dioxide layer 2 of the cap wafer D with a layer of photoresist,
2. Projecting light from an illuminator through a mask that contains the pattern to be created on bottom layer 2 of the cap wafer D, 3. Washing of the exposed regions of the photoresist layer and leaving an etch mask on the bottom silicon dioxide layer 2 of the cap wafer E,
4. Removing SiO$_2$ layer 2 of wafer B by CF$_4$/O$_2$ plasma etch,
5. Etching silicon layer 1 unprotected by photoresist by gases utilizing the deep reactive ion etch (DRIE) on the bottom of the cap wafer D, and
6. Removing of photoresist from the bottom silicon dioxide layer 2 of the cap wafer D yielding two cavities 13.

Figure 22A:
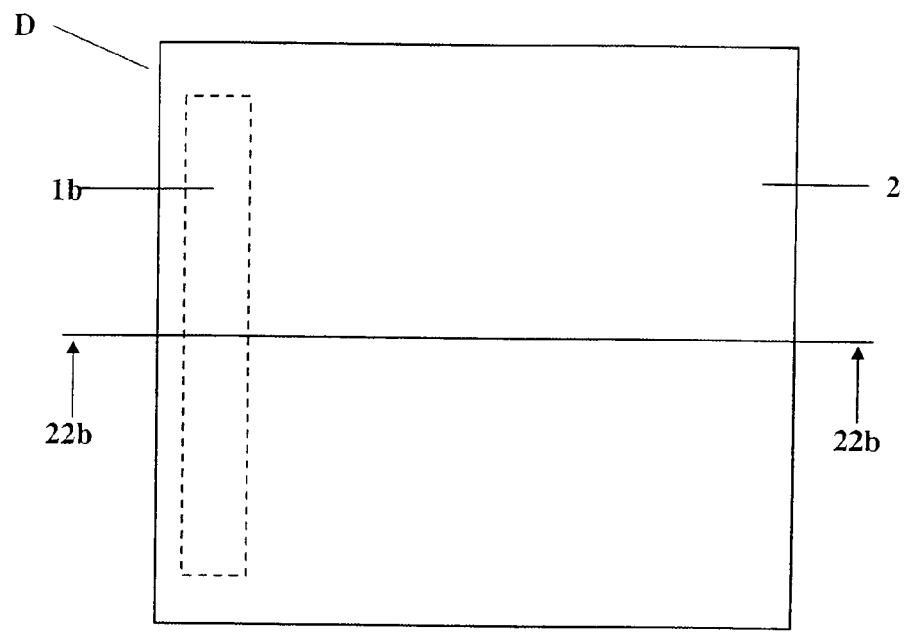
FIG. 22a is a top plan view of the preferred starting material of a cap wafer D and FIG. 22b is a cross-sectional view through the cap wafer D and the base wafer C of FIG. 22a at line 22b—22b of the cap wafer D bonded to the base wafer C.
Figure 22B:
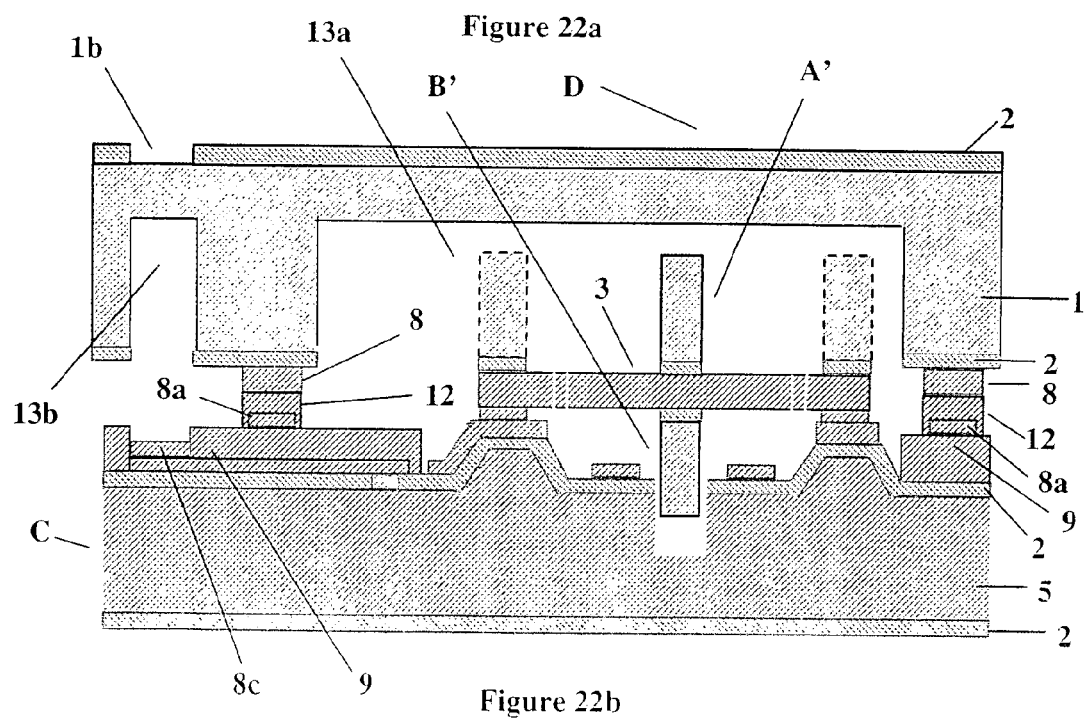

The cap wafer D is bonded to the base wafer C. The cap wafer D is positioned on top of base wafer C. A solder bond is carried out at low temperature at about 200° C. between the solder metal 12 of the cap wafer D and the seal ring metal 8a of the base wafer C, as shown in FIGS. 22a and 22b.

A channel 14 is formed by wet etch (KOH) of silicon from the top of cap wafer D. The channel 14 combines with the cavity 13b to form a channel for wire bonding as shown in FIGS. 23a and 23b.

The process preferably comprises:

Wet etching (KOH) of silicon from the top of the cap wafer D in the position of the hole 1b and generating a hole. The hole from the top of the cap wafer D forms with the cavity 13b from the bottom of the cap wafer D a channel 14.

Figure 23A:
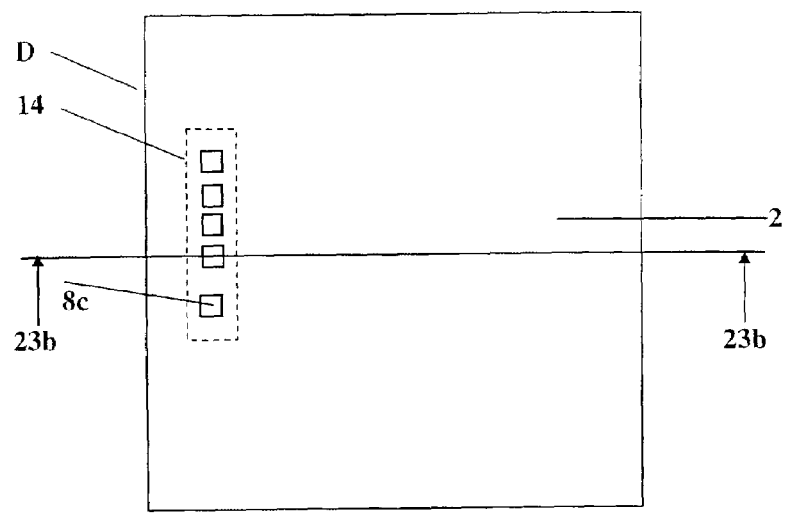
FIG. 23a is a top plan view of the preferred starting material of a cap wafer D and FIG. 23b is a cross-sectional view through the cap wafer D and the base wafer C of FIG. 23a at line 23b—23b of the cap wafer D bonded to the base wafer C after etching remaining silicon in the cap wafer D, to produce a channel for a wire dicing.
Figure 23B:
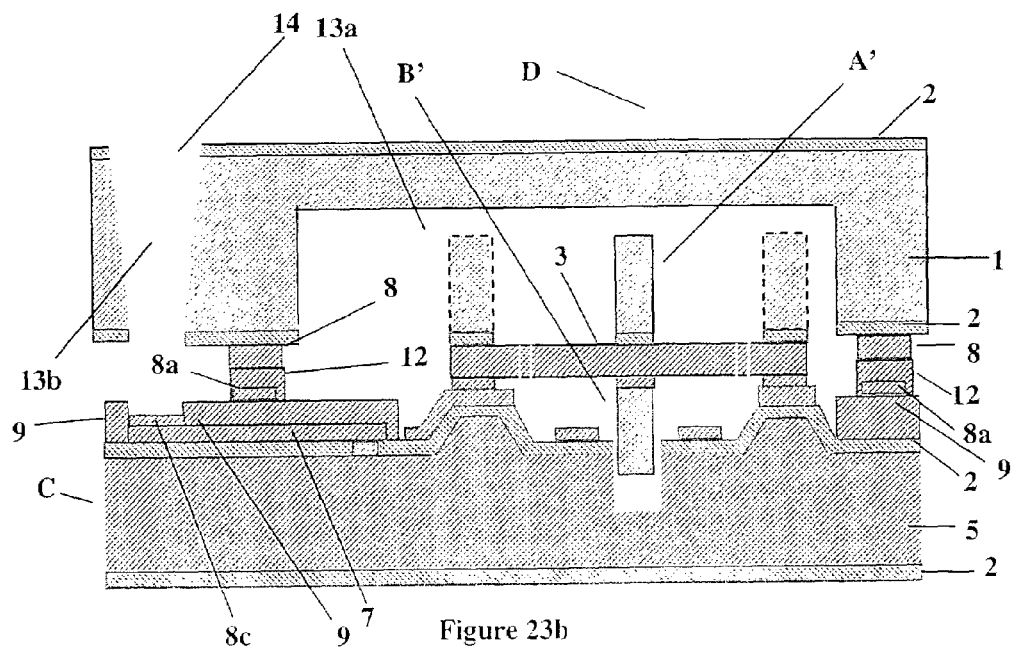

A ball bonding of wires 15 by vacuum oven bake is carried out as shown in FIGS. 23a and 23b. The process preferably comprises leading a wire 15 from the top of the cap wafer D through channel 14 and attaching the wire to the wire bonding pad Ti/Pt/Au 8c on the bottom wafer C.

Cloverleaf Microgyroscope with On-Chip Electronics

The bonded resonator wafer containing wafer resonator A and bottom post B' is prepared according to the same process as described above in regard to FIGS. 1–6. Therefore the same resonator wafer according to FIG. 6 is used to produce the cloverleaf microgyroscope with on-chip electronics.

Then a base wafer C is prepared. The preferred starting material 5 of the base wafer C has a thickness about $\leq 800$ µm and includes moderately doped silicon substrate p-type, 1e19 cm$^{-3}$, as shown in FIGS. 7a and 7b.

On both surfaces of the preferred starting material 5 of the base wafer C a silicon dioxide layer of $\leq 0.3$ µm-thick is grown by thermal oxidation at a temperature of about 950° C., as shown in FIGS. 8a and 8b.

Then a cavity CA formation is carried out. From the preferred starting material 5 a thickness of 5 µm to 8 µm is removed by photo resist lithography, co-pattern cavities, dry etch SiO$_2$ on front side and photo resist removal, wet KOH etch of Silicon and SiO$_2$ removal in order to obtain cavities, as shown in FIGS. 25a and 25b.

The process preferably comprises:
1. Coating the top and bottom SiO$_2$ layer 2 of wafer C with a layer of photoresist,
2. Projecting light from an illuminator through a mask that contains the pattern, namely the places for the cavities CA to be created, on the top layer 2 of wafer C,
3. Washing of the exposed regions of the photoresist layer and leaving an etch mask on the SiO$_2$ layer 2 of the wafer C patterning the cavities CA,
4. Removing the SiO$_2$ layer 2 by dry etch which is not covered by photoresist,
5. Removing 5–8 µm of moderate doped Si preferred starting material 5 by wet KOH etch to yield the cavities CA,
6. Removing of remaining photoresist, and
7. Removing SiO$_2$ layer 2 on the top and bottom layer by dry etch.

Then an ion implantation II and thermal oxidation is carried out by a 300 keV boron ion implantation ($10^{19}$ cm$^{-3}$) on the top surface of the preferred starting material silicon 5 of the base wafer C. After a photoresist removal a SiO$_2$ layer 2 of $\leq 0.2$ µm thick is grown by thermal oxidation at a temperature of about 950° C., on the top surface of material silicon 5 of the base wafer C as shown in FIGS. 26a and 26b.

The process preferably comprises:
1. Coating the top surface of silicon 5 of wafer C with a layer of photoresist,
2. Projecting light from an illuminator through a mask that contains the pattern, namely the places for the cavity ion implantation II shall be carried out, on the top surface 5 of wafer C,
3. Washing of the exposed regions of the photoresist layer and leaving an etch mask on the silicon surface 5 of the wafer C showing the location of the cavity ion implantation II,
4. 300 keV boron ion implantation ($10^{19}$ cm$^3$) is formed preferably to yield ion implantation II,
5. Removing of remaining photoresist.

Then a cavity planarization is carried out. The cavity planarization is preferably done by chemo mechanical polishing and applying a spin on dielectric DE on the cavity CA in the preferred starting material 5 of the base wafer as shown in FIGS. 27a and 27b.

Then an application specific integrated circuits (ASIC) electronic AS fabrication is carried out. A thermal oxidation of the surface of silicon 5 was carried out and a SiO$_2$ layer around the dielectric DE was developed. After that the dielectric DE was removed from preferred starting material 5 of the base wafer C as shown in FIGS. 28a and 28b.

Then an ohmic contact Al 6 was attached to the preferred starting material 5 of the base wafer C by photo resist spray lithography and metal deposition and liftoff, as shown in FIGS. 29a and 29b.

The process preferably comprises:
1. Coating SiO$_2$ layer 2 with a layer of photoresist,
2. Projecting light from an illuminator through a mask that contains the pattern, namely the places for the ohmic contact Al 6 to be created, on the layer 2 of wafer C,
3. Washing of the exposed regions of the photoresist layer and leaving an etch mask on the SiO$_2$ layer 2 of the wafer C,
4. Removing the SiO$_2$ layer 2 by wet etch which is not covered by photoresist,
5. Depositing Al 6 by spray lithography,
6. Removing of Al 6 covering the photoresist by a metal lift-off process,
7. Stripping of the remaining photoresist yielding an Al 6 pattern on the surface of wafer C.

Then an ohmic contact and interconnect metals Ti/Al 7 were attached to the preferred starting material 5 of the base wafer C by photo resist spray lithography and metal deposition and liftoff, as shown in FIGS. 30a and 30b.

The process preferably comprises:
1. Coating the top layer 2 of wafer C again with a layer of photoresist,
2. Projecting light from an illuminator through a mask that contains the pattern, namely the places for the interconnect metal Ti/Al 7 to be created, on the SiO$_2$ layer 2 of wafer C,
3. Depositing Ti/Al 7 by spray lithography, 4. Removing of Ti/Al 7 covering the photoresist by a metal lift-off process,
  5. Stripping of remaining photoresist and yielding a Ti/Al 7 pattern on the wafer C.

Then electrode metal (drive/sense electrodes) Ti/Pt/Au 8b, wire bond metal Ti/Pt/Au 8c, and wafer bonding metal Ti/Pt/Au 8d were provided by photoresist lithography and metal deposition and liftoff, as shown in FIGS. 31a and 31b.

The process preferably comprises:
  1. Coating the top surface of wafer C with a layer of photoresist
  2. Projecting light from an illuminator through a mask that contains the pattern, namely the places for the wire bond metal Ti/Pt/Au 8 to be created, on the top surface of wafer C,
  3. Washing of the exposed regions of the photoresist layer and leaving an mask on the top surface of the wafer C,
  4. Depositing Ti/PT/Au 8 on the surface of wafer C by spray lithography,
  5. Removing of excess Ti/PT/Au 8 covering the photoresist by a metal lift-off process,
  6. Stripping of remaining photoresist yielding a wire bond Ti/PT/Au 8.

Silicon nitride 9 layer is provided on the top of base wafer C by the dielectric layer deposition and patterning. A $Si_3N_4$ film $\leq 0.5$ μm thick is provided by deposition and photo resist lithography and removed by $CF_4/O_2$ plasma etch of $Si_3N_4$ in device and wire bond regions and by photo resist removal, as shown in FIGS. 32a and 32b.

The process preferably comprises:
  1. Coating the surface of wafer C with $Si_3N_4$ 9, with a thickness of about 0.5 μm,
  2. Coating $Si_3N_4$ 9 with a layer of photoresist,
  3. Projecting light from an illuminator through a mask that contains the pattern, namely covering the places for the interconnect metal dielectric layer $Si_3N_4$ 9 to be created, on the surface of wafer C,
  4. Washing of the exposed regions of the photoresist layer and leaving an mask on $Si_3N_4$ 9,
  5. Removing the $Si_3N_4$ 9 which is not covered by $CF_4/O_2$ plasma etch, and
  6. Stripping of remaining photoresist.

A seal ring metal 8a containing Ti/Pt/Au is provided on the silicon nitride 9 by metal patterning and deposition, particularly by photo resist lithography spray on thick resist and metal deposition and liftoff, as shown in FIGS. 33a and 33b.

The process preferably comprises:
  1. Coating the top surface of wafer C with a layer of photoresist,
  2. Projecting light from an illuminator through a mask that contains the pattern, namely the places for seal ring metal 8a containing Ti/Pt/Au provided on the silicon nitride 9 to be created, on the top surface of wafer C,
  3. Washing of the exposed regions of the photoresist layer and leaving an mask on the top surface of the wafer C,
  4. Depositing Ti/PT/Au on the surface of wafer C,
  5. Removing of excess Ti/PT/Au 8a covering the photoresist by a metal lift-off process,
  6. Stripping of remaining photoresist yielding removing of excess Ti/PT/Au 8a covering the photoresist by a metal lift-off process,
  7. Stripping of remaining photoresist yielding a seal ring 8a containing Ti/PT/Au on the silicon nitride 9.

As a next step a post hole etch 5' is carried out by photo resist lithography (spray on thick resist), $CF_4/O_2$ plasma etch of silicon dioxide in hole region, DRIE of silicon hole and photo resist removal as shown in FIGS. 34a and 34b.

The process comprises:
  1. Coating the top surface of wafer C with a layer of photoresist,
  2. Projecting light from an illuminator through a mask that contains the pattern, namely the place for the hole region on the top surface of wafer C,
  3. Washing of the exposed regions of the photoresist layer and leaving an mask on the top surface of the wafer C,
  4. $CF_4/O_2$ plasma etch of silicon dioxide in hole region,
  5. DRIE remove to create a silicon hole, and
  6. Stripping of the remaining photo resist layer.

As a next step, a bonding of resonator wafer A–B according to FIG. 6 and to base wafer C according to FIG. 34 is carried out preferably by an Au to Au thermo compression bonding at temperature of 300° C. to 400° C. The bonding is carried between the contacts 4 of resonator wafer A–B and the seal ring 8a of the base wafer C. Post B' of resonator wafer A–B fits into the post hole 5' of base wafer C as shown in FIG. 35b.

The post fabrication on wafer A is carried out by photo resist lithography (spray on thick resist), $CF_4/O_2$ plasma etch of silicon dioxide, photo resist removal by dry etch. Thereby a post A' and optional frame formation in the top layer A" is obtained, as shown in FIGS. 36a and 36b.

The process preferably comprises:
  1. Coating the top surface of wafer A with a layer of photoresist,
  2 Projecting light from an illuminator through a mask that contains the pattern, namely the place for the hole region on the top surface of wafer A,
  3 Washing of the exposed regions of the photoresist layer and leaving an mask on the top surface of the wafer A,
  4 DRIE removes silicon from wafer A,
  5 $CF_4/O_2$ plasma etch of silicon dioxide from wafer A, whereby a post A' and optional frame formation in the top layer A" is obtained, and
  6 Stripping of the remaining photo resist layer.

A cap wafer D is prepared with a starting material of lightly doped bulk silicon 1 having a thickness of $\leq 800$ μm and having on top and bottom a thin silicon dioxide layer, as shown in FIGS. 18a and 18b.

An opening 1b of silicon dioxide holes for front side silicon etching of wire bonding pad is carried out by photo resist lithography, dry etch of silicon dioxide and photo resist removal, as shown in FIGS. 19a and 19b.

Then, a backside metallization is carried out by photo resist lithography and metal deposition and liftoff. Thereby Ti/Pt/Au 8 and solder metal 12 are attached, as shown in FIGS. 20a and 20b.

Then backside cavities 13a and 13b are formed on the cap wafer D by spray thick photo resist on the backside, DRIE etch $SiO_2$, DRIE cavities and remove photo resist, as shown in FIGS. 21a and 21b.

The cap wafer D is bonded to the base wafer C. The cap wafer D is positioned on top of base wafer C. A solder bond is carried out at low temperature at about 200° C. between the solder metal 12 of the cap wafer D and the seal ring metal 8a of the base wafer C, as shown in FIGS. 37a and 37b. This preferred process step is carried out as described above in regards to FIGS. 22a and 22b.

A channel 14 is formed by wet etching (KOH) of silicon, as shown in FIGS. 38a and 38b. This preferred process step is carried out as described above in regard to FIGS. 23a and 23b.

The process preferably comprises the following steps. Wet etching (KOH) of silicon from the top of the cap wafer D in the position of the hole 1b and generating a hole. The hole from the top of the cap wafer D combines with the cavity 13 from the bottom of the cap wafer D generating a channel 14.

Figure 24A:
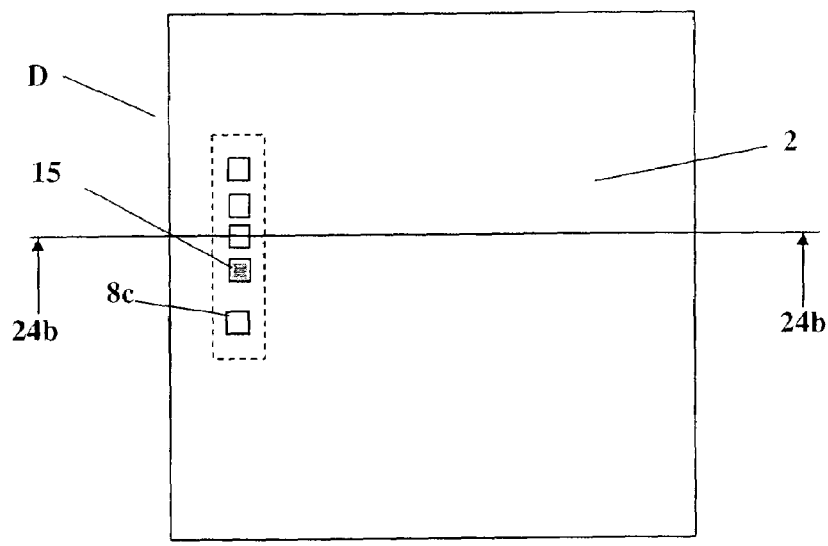
FIG. 24a is a top plan view of the preferred starting material of a cap wafer D and FIG. 24b is a cross-sectional view through the cap wafer D and the base wafer C of FIG. 24a at line 24b—24b of the cap wafer D bonded to the base wafer C after dicing and ball-bonding of wires.
Figure 24B:
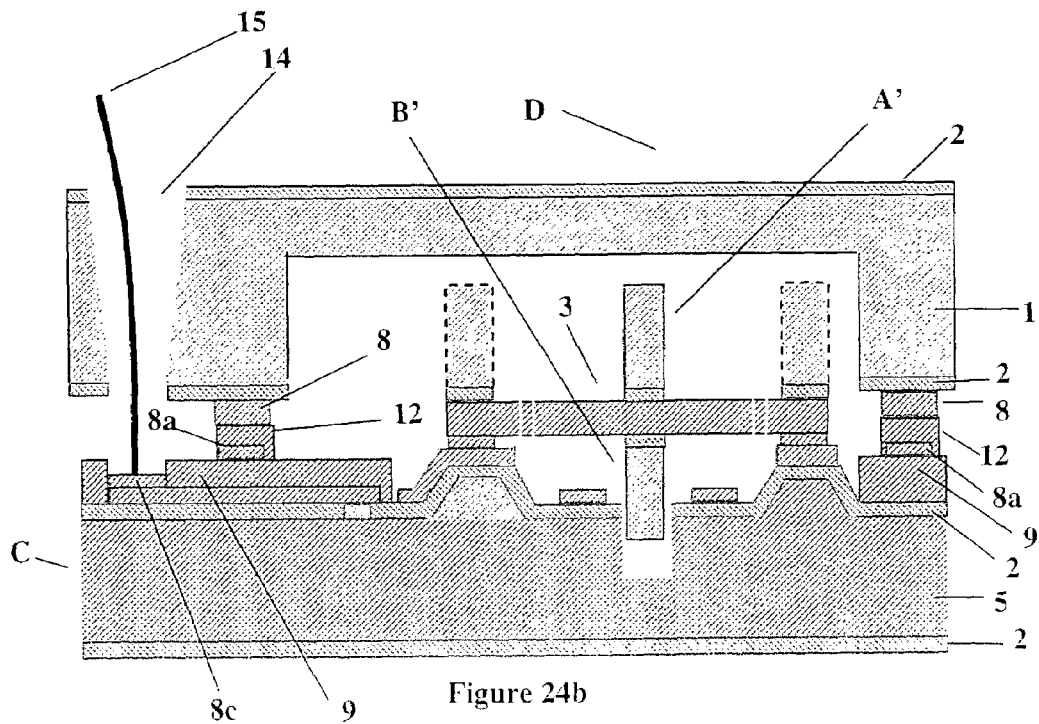

A ball bonding of wires 15 by vacuum oven bake is carried out as shown in FIGS. 39a and 39b. The process preferably comprises leading a wire 15 from the top of the cap wafer D and attaching the wire to the wire bonding pad Ti/Pt/Au 8c on the bottom wafer C. This process step is preferably carried out as described above in regards to FIGS. 24a and 24b.

Although certain preferred embodiments of the present invention have been described above, these should not be construed as limiting the scope of the invention but as merely providing illustrations of some of the presently preferred embodiments of this invention.

What we claim is:

1. A method of manufacturing a cloverleaf microgyroscope containing an integrated post comprising:
    a) attaching a post wafer to a resonator wafer,
    b) forming a bottom post from the post wafer being attached to the resonator wafer,
    c) attaching the resonator wafer to a base wafer, wherein the bottom post fits into a post hole in the base wafer,
    d) forming a top post from the resonator wafer, wherein the bottom and top post are formed symmetrically around the same axis, and
    e) attaching a cap wafer on top of the base wafer.

2. The method according to claim 1, wherein the top post is formed of a bulk silicon base having a thickness of $\leq 500$ μm, a silicon dioxide layer of $\leq 2$ μm and a heavily-doped Silicon epi-layer of 10 μm, p-type, 1e19-1e20 cm$^{-3}$.

3. The method according to claim 1, wherein the bottom post is formed of a bulk silicon base having a thickness of $\leq 500$ μm and a silicon dioxide layer of $\leq 2$ μm.

4. The method according to claim 1, wherein the base wafer is manufactured of substrate containing moderately doped silicon substrate p-type, 1e19 cm$^{-3}$ with a thickness of about $\leq 800$ μm.

5. The method according to claim 1, wherein ohmic contacts and interconnect metals containing Al or Al/Ti are formed preferably on the base wafer before the resonator wafer is attached to the base wafer.

6. The method according to claim 1, wherein electrodes, bond pad, and wire bond metal are formed on the base wafer before the resonator wafer is attached to the base wafer.

7. The method according to claim 1, wherein a seal ring containing Ti/Pt/Au is formed on the base wafer before the resonator wafer is attached to the base wafer.

8. The method according to claim 1, wherein the cap wafer is manufactured of lightly doped bulk silicon having a thickness of $\leq 800$ μm.

9. The method according to claim 1, wherein an opening is prepared in the cap wafer, a wire is led through the opening in the cap wafer and bonded to a bonding pad on the base wafer.

10. The method according to claim 1, wherein parts of heavily doped silicon layer of the resonator wafer are removed by resist lithography and photo resist removal.

11. The method according to claim 1, wherein the bondage between heavily-doped silicon epi-layer of the resonator and silicon dioxide layer of the post wafer is achieved by heating at a temperature from 800° C. to 1000° C.

12. The method according to claim 1, wherein bulk silicon layer and silicon dioxide of the post wafer are partially removed to yield the bottom post by resist lithography, $CF_4/O_2$ plasma etch $SiO_2$ and removal of photo resist.

13. The method according to claim 1, wherein the bonding of the resonator wafer to the base wafer is carried out by an Au to Au thermo-compression bonding at temperature from 200° C. to 500° C.

14. The method according to claim 1, wherein a bulk silicon layer and silicon dioxide of the resonator wafer are partially removed to yield a top post by resist lithography, $CF_4/O_2$ plasma etch of $SiO_2$ and removal of photo resist.

15. The method according to claim 1, wherein the bondage between the cap wafer and the base wafer is carried out with solder metal at temperature at about 100° C. to 300° C.

16. The method according to claim 1, wherein a hole in the cap wafer is formed by wet etch of silicon and vacuum oven baking.

17. The method according to claim 1, wherein the wire bonding is carried out by saw cutting of cap wafer and ball bonding of wires to wire bonding pad of the base wafer.

18. A cloverleaf micro gyroscope with off-chip electronic manufactured by this method according to claim 1 comprising:
    a) attaching a post wafer to a resonator wafer,
    b) forming a bottom post from the post wafer being attached to the resonator wafer,
    c) attaching the resonator wafer to a base wafer, wherein the bottom post fits into a post hole in the base wafer,
    d) forming a top post from the resonator wafer, wherein the bottom and top post are formed symmetrically around the same axis, and
    e) attaching a cap wafer on top of the base wafer.

19. A method of manufacturing a cloverleaf micro gyroscope containing an integrated post comprising:
    a) attaching a post wafer to a resonator wafer,
    b) forming a bottom post from the post wafer being attached to the resonator wafer,
    c) application specific integrated circuits (ASIC) electronic on a base wafer,
    d) attaching the resonator wafer to the base wafer, wherein the bottom post fits into a post hole in the base wafer,
    e) forming a top post from the resonator wafer, wherein the bottom and top post are formed symmetrically around the same axis, and
    f) attaching a cap wafer on top of the base wafer.

20. The method according to claim 19, wherein the top post is formed of a bulk silicon base having a thickness of $\leq 500$ μm, a silicon dioxide layer of $\leq 2$ μm and a heavily-doped Silicon epi-layer of 10 μm–20 μm, p-type, 1e19-1e20 cm$^{-3}$.

21. The method according to claim 19, wherein the bottom post is formed of a bulk silicon base having a thickness of $\leq 500$ μm and a silicon dioxide layer of $\leq 2$ μm.

22. The method according to claim 19, wherein the base wafer is manufactured of substrate containing moderately doped silicon substrate p-type, 1e19 cm$^{-3}$ with a thickness of about $\leq 800$ μm.

23. The method according to claim 19, wherein a cavity is formed, an ion implantation and thermal oxidation and cavity planarization is carried out in the starting material of the base wafer before a specific integrated circuits electronic is formed on the base wafer.

24. The method according to claim 19, wherein ohmic contacts containing Al or Al/Ti are formed after specific integrated circuits (ASIC) electronics are formed on the base wafer and before the resonator wafer is attached to the base wafer.

25. The method according to claim 19, wherein electrodes, bond pad, and wire bond metal are formed on the base wafer before the resonator wafer is attached to the base wafer.

26. The method according to claim 19, wherein a seal ring containing Ti/Pt/Au is formed on the base wafer before the resonator wafer is attached to the base wafer.

27. A method according to claim 19, wherein the cap wafer is manufactured of lightly doped bulk silicon having a thickness of $\leq 800$ μm.

28. A method according to claim 19, wherein an opening is prepared in the cap wafer, a wire is led through the opening in the cap wafer and bonded to a bonding pad on the base wafer.

29. A method according to claim 19, wherein parts of heavily doped silicon layer of the resonator wafer are removed by resist lithography and photo resist removal.

30. A method according to claim 19, wherein the bondage between heavily-doped silicon epi-layer of the resonator and silicon dioxide layer of the post wafer is achieved by heating at a temperature from 800° C. to 1000° C.

31. A method according to claim 19, wherein bulk silicon layer and silicon dioxide of the post wafer are partially removed to yield the bottom post by resist lithography, $CF_4/O_2$ plasma etch $SiO_2$ and removal of photo resist.

32. A method according to claim 19, wherein the bonding of the resonator wafer to the base wafer is carried out by an Au to Au thermo-compression bonding at temperature from 200° C. to 500° C.

33. A method according to claim 19, wherein a bulk silicon layer and silicon dioxide of the resonator wafer are partially removed to yield a top post by resist lithography, $CF_4/O_2$ plasma etch of $SiO_2$ and removal of photo resist.

34. A method according to claim 19, wherein the bondage between the cap wafer and the base wafer is carried out with solder metal at temperature at about 100° C. to 300° C.

35. A method according to claim 19, wherein a hole in the cap wafer is formed by wet etch of silicon and vacuum oven baking.

36. A method according to claim 19, wherein the wire bonding is carried out by saw cutting of cap wafer and ball bonding of wires to wire bonding pad of the base wafer.

37. A cloverleaf microgyroscope with on-chip electronics manufactured by this method according to claim 19 comprising:
   a) attaching a post wafer to a resonator wafer,
   b) forming a bottom post from the post wafer being attached to the resonator wafer,
   c) application specific integrated circuits (ASIC) electronics on a base wafer,
   d) attaching the resonator wafer to the base wafer, wherein the bottom post fits into a post hole in the base wafer,
   e) forming a top post from the resonator wafer, wherein the bottom and top post are formed symmetrically around the same axis, and
   f) attaching a cap wafer on top of the base wafer.

* * * * *